(12) United States Patent
Suehiro et al.

(10) Patent No.: US 7,738,788 B2
(45) Date of Patent: Jun. 15, 2010

(54) ADDRESS RECOGNITION APPARATUS

(75) Inventors: Masayuki Suehiro, Tokyo (JP); Shinji Iio, Musahino (JP); Daisuke Hayashi, Tokyo (JP); Morio Wada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 742 days.

(21) Appl. No.: 11/563,570

(22) Filed: Nov. 27, 2006

(65) Prior Publication Data

US 2007/0122150 A1    May 31, 2007

(30) Foreign Application Priority Data

Nov. 30, 2005   (JP) .............................. 2005-345230

(51) Int. Cl.
*H04J 14/00* (2006.01)
*H04J 14/02* (2006.01)

(52) U.S. Cl. .............................. 398/53; 398/45; 398/46; 398/47; 398/48; 398/49; 398/50; 398/51; 398/52; 398/54; 398/55; 398/56; 398/57

(58) Field of Classification Search .................. 398/45, 398/46, 47, 48, 49, 50, 51, 52, 53, 54, 55, 398/56, 57
See application file for complete search history.

(56) References Cited

U.S. PATENT DOCUMENTS 5,060,305 A * 10/1991 Prucnal et al. ................ 398/53

2005/0194519 A1 * 9/2005 Wada et al. ............. 250/214 R

FOREIGN PATENT DOCUMENTS

JP     2002-305478 A    10/2002

OTHER PUBLICATIONS

Daniel J. Blumenthal et al., "Photonic Packet Switches: Architectures and Experimental Implementations", Nov. 1994, Proceedings of the IEEE, vol. 82, No. 11, pp. 1650-1667.*

* cited by examiner

*Primary Examiner*—Ken N Vanderpuye
*Assistant Examiner*—Daniel G Dobson
(74) *Attorney, Agent, or Firm*—Sughrue Mion, PLLC

(57) ABSTRACT

An address recognition apparatus may include a first normalizing unit, a second normalizing unit and an address determination unit. The first normalizing unit normalizes a first electric signal and generates a first normalized signal, wherein the first electric signal is associated with a first divided set of optical packet signals. The second normalizing unit normalizes a second electric signal and generates a second normalized signal, wherein the second electric signal is associated with a second divided set of optical packet signals. The address determination unit refers to the first and second normalized signals and determines whether a destination address of a set of optical packet signals is identical to or different from an address allocated to a self-station associated with the address recognition apparatus, wherein the set of optical packet signals has been divided into the first and second divided sets of optical packet signals.

10 Claims, 6 Drawing Sheets

ADDRESS RECOGNITION APPARATUS

BACKGROUND OF THE INVENTION

1. Field of the Invention

The present invention generally relates to an address recognition apparatus in optical packet communications.

Priority is claimed on Japanese Patent Application No. 2005-345230, filed Nov. 30, 2005, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

As in the recent years the Internet has been widely and rapidly spread, the requirement for realizing a high speed and large capacity network has been on the increase. In order to realize the network, an optical fiber communication has been developed and practiced. The optical fiber provides a transmission path that is adapted to transmit information as optical signal, instead of electrical signal. In the optical fiber communication, an optical packet communication has been established, wherein a set of information is divided into a plurality of optical packets that are to be transmitted on the optical fiber.

For preventing any substantive reduction of the transmission rate, it is desired to avoid that a set of optical signals being transmitted on the optical fiber is converted into a set of electrical signals so that the set of electrical signals are then processed. In this viewpoint, the optical packet communication can use an address recognition apparatus that is configured to recognize a destination address, to which one or more optical packets are intended to be transmitted. FIG. 5 is a diagram illustrating a configuration of a conventional address recognition apparatus to be used in the optical packet communication.

An address recognition apparatus 10 includes a first optical path 1, a second optical path 2, a first light receiving device 3, a second light receiving device 4, a DC power supply 5, a resistive element 6, an amplifier 7, and an address determining unit 8. Each of the first and second optical paths 1 and 2 is optically coupled to an optical fiber 20 that is adapted to transmit optical packet signals. The optical fiber 20 is also optically coupled to a delay optical fiber 20a. An optical packet signal processor 30 is optically coupled through the delay optical fiber 20a to the optical fiber 20.

A set of optical packet signals is transmitted on the optical fiber 20, and then divided into a first divided set of optical packet signal s1, a second divided-set of optical packet signal s2, and a third divided-set of optical packet signal.

The first optical path 1 is formed by an optical fiber that has a predetermined optical path length. The first optical path 1 has a first emitting edge 1a. The first optical path 1 is adapted to transmit the first divided-set of optical packet signals s1 to the first emitting edge 1a so that a first divided beam of light representing the first divided-set of optical packet signals s1 is emitted from the first emitting edge 1a toward the first light receiving device 3.

The second optical path 2 has a second emitting edge 2a. The second optical path 2 is formed by an optical fiber that has a predetermined optical path length that is longer by a difference $\Delta L1$ than that of the first optical path 1. The second optical path 2 has a second emitting edge 2a. The second optical path 2 is adapted to transmit the second divided-set of optical packet signals s2 to the second emitting edge 2a so that a second divided beam of light representing the second divided-set of optical packet signals s2 is emitted from the second emitting edge 2a toward the second light receiving device 4.

The first light receiving device 3 is realized by a first photodiode that is adapted to receive the first divided beam of light representing the first divided-set of optical packet signals s1 and generate a first photocurrent $I_1$ representing a first intensity of the first divided beam of light. The first light receiving device 3 has a cathode electrode that is electrically coupled to the DC power supply 5. The first light receiving device 3 has an anode electrode that is electrically coupled to an anode electrode of the second light receiving device 4. The anode electrode of the first light receiving device 3 is also electrically coupled to a first side of the resistive element 6. The anode electrode of the first light receiving device 3 is also electrically coupled to an input of the amplifier 7.

The second light receiving device 4 is realized by a second photodiode that is adapted to receive the second divided beam of light representing the second divided-set of optical packet signals s2 and generate a second photocurrent $I_2$ representing a second intensity of the second divided beam of light. The second light receiving device 4 has a cathode electrode that is electrically coupled to the DC power supply 5. The second light receiving device 4 has an anode electrode that is electrically coupled to the anode electrode of the first light receiving device 3. The anode electrode of the second light receiving device 4 is also electrically coupled to the first side of the resistive element 6. The anode electrode of the second light receiving device 4 is also electrically coupled to the input of the amplifier 7.

The DC power supply 5 supplies a DC voltage Vcc to the cathode electrodes of the first and second light receiving devices 3 and 4. The resistive element 6 can be realized by a circuitry having a resistive impedance. The resistive element 6 has the first side that is electrically coupled to the anode electrodes of the first and second light receiving devices 3 and 4 and also coupled to the input of the amplifier 7. The resistive element 6 also has a second side that is electrically grounded.

The amplifier 7 is adapted to receive a voltage signal V0 that appears across the resistive element 6 and generate an amplified voltage signal V1.

The address determining unit 8 is functionally coupled to the amplifier 7 to receive the amplified voltage signal V1 from the amplifier 7. The address determining unit 8 is configured to perform a predetermined set of signal processing, based on the amplified voltage signal V1, so as to determine whether or not the received set of optical packet signals that has been transmitted on the optical fiber 20 has a destination address to the self station associated with the address recognition apparatus 10. The address determining unit 8 is configured to generate an address determination signal that represents the result of determination on the address. The address determining unit 8 is configured to supply the address determination signal to the optical packet signal processor 30 that is placed on the follower stage to the address recognition apparatus 10.

The delay optical fiber 20a can be realized by an optical fiber that has a delay optical path length difference $\Delta L2$ from the first optical path length of the first optical path 1. The delay optical fiber 20a can be adapted to transmit the third divided-set of optical packet signal from the optical fiber 20 to the optical packet signal processor 30.

The optical packet signal processor 30 is optically coupled to the delay optical fiber 20a to receive the third divided-set of optical packet signal that has been transmitted on the delay optical fiber 20a. The optical packet signal processor 30 is functionally coupled to the address determining unit 8 to receive the address determination signal from the address determining unit 8. The optical packet signal processor 30 is configured to perform a predetermined set of signal processing of the third divided-set of optical packet signal, based on the address determination signal, thereby generating a set of processed optical packet signals. In a case, the optical packet signal processor 30 can be configured to transmit the set of processed optical packet signals to the optical communication network. In another case, the optical packet signal processor 30 can be configured to transmit, without performing any processing, the third divided-set of optical packet signal to the optical communication network.

Operations of the address recognition apparatus 10 will be described. The set of optical packet signals is transmitted on the optical fiber 20, and then divided into the first divided set of optical packet signal s1 to be transmitted on the first optical path 1, a second divided-set of optical packet signal s2 to be transmitted on the second optical path 2, and a third divided-set of optical packet signal to be transmitted on the delayed optical fiber 20a.

FIG. 6A is a timing chart illustrating a waveform of a first example of the optical packet signal that is input into the address recognition apparatus 10 shown in FIG. 5. FIG. 6B is a timing chart illustrating a waveform of a second example of the optical packet signal that is input into the address recognition apparatus 10 shown in FIG. 5. As shown in FIGS. 6A and 6B, the optical packet signal includes a header bit d1 so called to as a frame delimiter, an address bit d2 defining a destination address, and a payload d3 including various types of data. In the case of optical packet communication, the timing of appearing the address bit d2 represents the address. Namely, the coordinate on the time-axis of the address bit d2 defines the address. The address bit d2 shown in FIG. 6A is different in the position on the time axis from the address bit d2 shown in FIG. 6B. This means that the optical packet signals shown in FIGS. 6A and 6B have different destination addresses.

As described above, the first divided set of optical packet signal s1 is transmitted on the first optical path 1 and then emits from the first emitting edge 1a toward the first light receiving device 3. The second divided set of optical packet signal s2 is transmitted on the second optical path 2 and then emits from the second emitting edge 2a toward the second light receiving device 4. The second optical path 2 is longer by the optical path length difference ΔL1 than the first optical path 1. The optical path length difference ΔL1 causes a difference in time between when the first light receiving device 3 receives the first divided set of optical packet signal s1 and when the second light receiving device 4 receives the second divided set of optical packet signal s2.

FIG. 7 is a timing chart illustrating a time difference between when the first light receiving device 3 receives the first divided set of optical packet signal s1 and when the second light receiving device 4 receives the second divided set of optical packet signal s2. The optical path length difference ΔL1 is previously adjusted so that the address bit d2 of the first divided set of optical packet signal received by the first light receiving device 3 is phase-matched to the header bit d2 of the second divided set of optical packet signal received by the second light receiving device 4. In other words, only when the set of optical packet signal transmitted on the optical fiber 20 has a specific or predetermined destination address, then the first and second light receiving devices 3 and 4 receive concurrently the address bit d2 of the first divided set of optical packet signal s1 and the header bit d1 of the second divided set of optical packet signal, respectively.

If the first and second light receiving devices 3 and 4 receive concurrently the address bit d2 of the first divided set of optical packet signal s1 and the header bit d1 of the second divided set of optical packet signal, respectively, then this means that the set of optical packet signal transmitted on the optical fiber 20 has the destination address that is identical to the address of the self station associated with the address recognition apparatus 10. In this case, almost the same photocurrents flow through the first and second light receiving devices 3 and 4, and the voltage signal V0 across the resistive element 6 is caused, which has a first voltage level.

If the first and second light receiving devices 3 and 4 receive, at different timings, the address bit d2 of the first divided set of optical packet signal s1 and the header bit d1 of the second divided set of optical packet signal, respectively, then this means that the set of optical packet signal transmitted on the optical fiber 20 has a different destination address from the address of the self station associated with the address recognition apparatus 10. In this case, a photocurrent flows either one of the first and second light receiving devices 3 and 4, and the voltage signal V0 across the resistive element 6 is caused, which has a second voltage level that is equal to a half of the first voltage level.

The voltage signal V0 is input into the amplifier 7 and amplified into an amplified voltage signal V1 by the amplifier 7. The amplified voltage signal V1 is input into the address determining unit 8.

FIG. 8 is a diagram illustrating a relationship of an amplified voltage signal V1 to a given threshold. The address determining unit 8 is configured to compare the maximum value of the amplified signal V1 with the threshold. If the address determining unit 8 verifies that the maximum value is equal to or higher than the threshold, then the address determining unit 8 determines that the set of optical packet signals transmitted on the optical fiber 20 has the same destination address as the address to the self station associated with the address recognition apparatus 10, thereby generating a first state of address determination signal. The first state of address determination signal can be high. The first state of address determination signal is input into the optical packet signal processor 30.

If the address determining unit 8 verifies that the maximum value is lower than the threshold, then the address determining unit 8 determines that the set of optical packet signals transmitted on the optical fiber 20 has a different destination address from the address to the self station associated with the address recognition apparatus 10, thereby generating a second state of address determination signal. The second state of address determination signal can be low. The second state of address determination signal is input into the optical packet signal processor 30.

The third divided set of optical packet signal is transmitted on the delay optical fiber 20a. The delay optical path length difference ΔL2 of the delay optical fiber 20a causes a time delay in allowing the optical packet signal processor 30 to receive the third divided set of optical packet signal. The delay optical path length difference ΔL2 is set taking into account a time until the address determination process is completed by the address determining unit 8.

Upon receipt of the input of the first state of state of address determination signal, the optical packet signal processor 30 determines that the address of the set of optical packet signals transmitted on the optical fiber 20 has the same destination address as the address of the self station associated with the address recognition apparatus 10. In this case, the optical packet signal processor 30 applies the predetermined set of signal processing to the third divided set of optical packet signal that has been transmitted on the delay optical fiber 20a, and the optical packet signal processor 30 transmits a set of processed optical packet signal to the optical communication network.

Upon receipt of the input of the second state of state of address determination signal, the optical packet signal processor 30 determines that the address of the set of optical packet signals transmitted on the optical fiber 20 has a different destination address from the address of the self station associated with the address recognition apparatus 10. In this case, the optical packet signal processor 30 transmits the third divided set of optical packet signal to the optical communication network without performing any processing.

The address recognition apparatus 10 to be used in the optical packet communication is configured to determine whether or not the set of input optical packet signals transmitted on the optical fiber 20 has an address that is defined by an optical path length difference between the first and second optical paths 1 and 2. If the address recognition apparatus 10 verifies that the set of input optical packet signals has the address that is defined by the optical path length difference, then the address recognition apparatus 10 recognizes that the set of input optical packet signals has the same address as the address of the self station associated with the address recognition apparatus 10.

In other words, the address recognition apparatus 10 is configured to determine whether or not the set of input optical packet signals transmitted on the optical fiber 20 has an address that allows the first and second light receiving devices 3 and 4 to receive concurrently the address bit d2 of the first divided set of optical packet signal s1 and the header bit d1 of the second divided set of optical packet signal, respectively. If the address recognition apparatus 10 verifies that the set of input optical packet signals has the address that allows the first and second light receiving devices 3 and 4 to receive concurrently the address bit d2 and the header bit d1 respectively, then the address recognition apparatus 10 recognizes that the set of input optical packet signals has the same address as the address of the self station associated with the address recognition apparatus 10.

Japanese Unexamined Patent Application, First Publication, No. 2002-305478 discloses a conventional technique for an address processor to be used in the optical packet communication. The conventional address processor has a reduced number of parts or elements that need to perform address processing operations. The conventional technique is related to scale down the processor and to improve high speed performance.

In the address recognition apparatus 10 shown in FIG. 5, the intensity of the set of optical packet signals transmitted on the optical fiber 20 is not always constant but may vary largely. For example, if the first and second light receiving devices 3 and 4 receive concurrently the address bit d2 of the first divided set of optical packet signal s1 and the header bit d1 of the second divided set of optical packet signal, respectively, then this means that the set of optical packet signal transmitted on the optical fiber 20 has the destination address that is identical to the address of the self station associated with the address recognition apparatus 10. In this case, however, it is possible that the intensity of the set of input optical packet signals having been transmitted on the optical fiber 20 is so weak that the amplified voltage signal V1 is lower than the threshold, whereby the address recognition apparatus 10 determines incorrectly that the set of optical packet signal transmitted on the optical fiber 20 has a different destination address from the address of the self station associated with the address recognition apparatus 10.

If the first and second light receiving devices 3 and 4 receive, at different timings, the address bit d2 of the first divided set of optical packet signal s1 and the header bit d1 of the second divided set of optical packet signal, respectively, then this means that the set of optical packet signal transmitted on the optical fiber 20 has a different destination address from the address of the self station associated with the address recognition apparatus 10. In this case, however, it is possible that the intensity of the set of input optical packet signals having been transmitted on the optical fiber 20 is so strong that the amplified voltage signal V1 is higher than the threshold, whereby the address recognition apparatus 10 determines incorrectly that the set of optical packet signal transmitted on the optical fiber 20 has the same destination address as the address of the self station associated with the address recognition apparatus 10.

The large variation in the intensity of the set of optical packet signals transmitted on the optical fiber 20 may, in case, cause the address recognition apparatus 10 to recognize incorrectly the destination address of the set of input optical packet signals.

In view of the above, it will be apparent to those skilled in the art from this disclosure that there exists a need for an improved address recognition apparatus and/or an improved address recognition method. This invention addresses this need in the art as well as other needs, which will become apparent to those skilled in the art from this disclosure.

SUMMARY OF THE INVENTION

Accordingly, it is a primary object of the present invention to provide an address recognition apparatus.

It is another object of the present invention to provide an address recognition apparatus adapted to correctly recognize a destination address of a set of input optical packet signals even if the set of input optical packet signals largely varies in the intensity of light.

It is a further object of the present invention to provide an address recognition method.

In accordance with a first aspect of the present invention, an address recognition apparatus for recognizing a destination address of a set of optical packet signals. The address recognition apparatus sets a delay time of an address bit from a header bit based on the destination address. The address bit and the header bit are included in the set of optical packet signals. The address recognition apparatus may include an optical divider, a first light receiving device, a second light receiving device, a first normalizing unit, a second normalizing unit, and an address determination unit.

The optical divider may be configured to divide the set of optical packet signals into first and second divided sets of optical packet signals. The optical divider may be configured to emit the first and second divided sets of optical packet signals with an allocated time difference from each other. The first light receiving device may be adapted to receive the first divided set of optical packet signals and output a first light receiving signal. The second light receiving device may be adapted to receive the second divided set of optical packet signals and output a second light receiving signal. The first normalizing unit may be configured to normalize the first light receiving signal so that the maximum value of the first light receiving signal is equal to a predetermined value, thereby generating a first normalized signal. The second normalizing unit may be configured to normalize the second light receiving signal so that the maximum value of the second light receiving signal is equal to the predetermined value, thereby generating a second normalized signal. The address determination unit may be configured to determine the destination address of the set of optical packet signals, based on the first and second normalized signals.

Preferably, the address determination unit may be configured to compare the maximum value of an added signal with a threshold. The added signal has been prepared by adding the first and second normalized signals. The address determination unit may be configured to determine that the designation address is identical to an address allocated to a self-station associated with the address recognition apparatus if the maximum value of the added signal is equal to or higher than the threshold. The address determination unit may be configured to determine that the designation address is different from the address allocated to the self-station if the maximum value of the added signal is lower than the threshold.

Preferably, the first light receiving device may include a first photodiode that outputs a first current signal. Preferably, the second light receiving device may also include a second photodiode that outputs a second current signal. The address recognition apparatus may further include a DC power supply, and a resistive element. The DC power supply may be configured to supply a DC voltage to cathodes of the first and second photodiodes. The resistive element may have first and second sides, wherein the first side is connected to outputs of the first and second normalizing units and an input of the address determination unit, and the second side is grounded. Preferably, the first photodiode may have an anode connected to an input of the first normalizing unit. Preferably, the second photodiode may have an anode connected to an input of the second normalizing unit. Preferably, the first normalizing unit may be configured to normalize the first current signal so that the maximum value of the first current signal is equal to a predetermined value. Preferably, the second normalizing unit may be configured to normalize the second current signal so that the maximum value of the second current signal is equal to the predetermined value. Preferably, the address determination unit may be configured to compare the maximum value of a voltage signal across the resistive element with a threshold. The address determination unit may be configured to determine that the designation address is identical to an address allocated to a self-station associated with the address recognition apparatus if the maximum value of the voltage signal is equal to or higher than the threshold. The address determination unit may be configured to determine that the designation address is different from the address allocated to the self-station if the maximum value of the voltage signal is lower than the threshold.

Preferably, the first light receiving device may include a first photodiode that outputs a first current signal. Preferably, the second light receiving device may include a second photodiode that outputs a second current signal. Preferably, the address recognition apparatus may further include a first resistive element, a second resistive element, and a DC power supply. The first resistive element may have first and second sides, wherein the first side is connected to an anode of the first photodiode and an input of the first normalizing unit, and the second side is grounded. The second resistive element may have first and second sides, wherein the first side is connected to an anode of the second photodiode and an input of the second normalizing unit, and the second side is grounded. The DC power supply may be configured to supply a DC voltage to cathodes of the first and second photodiodes. The first normalizing unit may be configured to normalize a first voltage signal across the first resistive element so that the maximum value of the first voltage signal is equal to a predetermined value. The second normalizing unit may be configured to normalize a second voltage signal across the second resistive element so that the maximum value of the second voltage signal is equal to the predetermined value. The address determination unit may be configured to compare the maximum value of an added signal with a threshold. The added signal has been prepared by adding the first and second voltage signals. The address determination unit may be configured to determine that the designation address is identical to an address allocated to a self-station associated with the address recognition apparatus if the maximum value of the added signal is equal to or higher than the threshold. The address determination unit may be configured to determine that the designation address is different from the address allocated to the self-station if the maximum value of the added signal is lower than the threshold.

In accordance with a second aspect of the present invention, an address recognition apparatus for recognizing a destination address of a set of optical packet signals. The address recognition apparatus sets a delay time of an address bit from a header bit based on the destination address. The address bit and the header bit are included in the set of optical packet signals. The address recognition apparatus may include an optical divider, a first light receiving device, a second light receiving device, a first normalizing unit, a second normalizing unit, a first comparator, a second comparator, a logical AND circuit, and an address determination unit. The optical divider may be configured to divide the set of optical packet signals into first and second divided sets of optical packet signals. The optical divider may be configured to emit the first and second divided sets of optical packet signals with an allocated time difference from each other. The first light receiving device may be adapted to receive the first divided set of optical packet signals and output a first light receiving signal. The second light receiving device may be adapted to receive the second divided set of optical packet signals and output a second light receiving signal. The first normalizing unit may be configured to normalize the first light receiving signal so that the maximum value of the first light receiving signal is equal to a predetermined value, thereby generating a first normalized signal. The second normalizing unit may be configured to normalize the second light receiving signal so that the maximum value of the second light receiving signal is equal to the predetermined value, thereby generating a second normalized signal. The first comparator may be configured to compare the first normalized signal with a first threshold, thereby generating a first comparison digital signal. The second comparator may be configured to compare the second normalized signal with a second threshold, thereby generating a second comparison digital signal. The logical AND circuit may be configured to perform a logical AND operation of the first and second comparison digital signals, thereby generating a logic output. The address determination unit may be configured to determine whether the destination address of the set of packet signals is identical to or different from an address allocated to a self-station associated with the address recognition apparatus.

In accordance with a third aspect of the present invention, an address recognition apparatus may include a first normalizing unit, a second normalizing unit and an address determination unit. The first normalizing unit may be configured to normalize a first electric signal and generate a first normalized signal, wherein the first electric signal is associated with a first divided set of optical packet signals. The second normalizing unit may be configured to normalize a second electric signal and generate a second normalized signal, wherein the second electric signal is associated with a second divided set of optical packet signals. The address determination unit may be adapted to refer to the first and second normalized signals and determine whether a destination address of a set of optical packet signals is identical to or different from an address allocated to a self-station associated with the address recognition apparatus, wherein the set of optical packet signals has been divided into the first and second divided sets of optical packet signals.

Preferably, the address determination unit may be configured to refer to maximum values of the first and second normalized signals.

Preferably, the first and second normalizing units may be configured to normalize maximum values of the first and second electric signals, respectively.

Preferably, the address determination unit may be configured to generate an added signal from the first and second normalized signals and compare a maximum value of the added signal with a first threshold.

Preferably, if the maximum value of the added signal is equal to or higher than the first threshold, then the address determination unit determines that the destination address is identical to the address allocated to the self-station. If the maximum value of the added signal is lower than the first threshold, then the address determination unit determines that the destination address is different from the address allocated to the self-station.

The address determination unit may be configured to compare each of first and second maximum values of the first and second normalized signals with a second threshold.

Preferably, if each of the first and second maximum values is equal to or higher than the second threshold, then the address determination unit determines that the destination address is identical to the address allocated to the self-station. If one of the first and second maximum values is equal to or higher than the second threshold and another of the first and second maximum values is lower than the second threshold, then the address determination unit determines that the destination address is different from the address allocated to the self-station.

Preferably, the address recognition apparatus may further include a divider, a first light receiving device, a second light receiving device, and a resistive element. The divider may be configured to divide the set of optical packet signals into the first and second divided sets of optical packet signals. The first light receiving device may be adapted to receive the first divided set of optical packet signals and generate a first photocurrent signal as the first electric signal. The first light receiving device may be coupled to the first normalizing unit so as to supply the first photocurrent signal to the first normalizing unit. The second light receiving device may be adapted to receive the second divided set of optical packet signals and generate a second photocurrent signal as the second electric signal. The second light receiving device may be coupled to the second normalizing unit to supply the second photocurrent signal to the second normalizing unit. The resistive element may be coupled between each output of the first and second normalizing units and a fixed voltage supply. The resistive element generates a voltage signal at the outputs of the first and second normalizing units. The voltage signal is proportional to a sum of the first and second photocurrent signals.

Preferably, the address recognition apparatus may further include a divider, a first light receiving device, a second light receiving device, a first resistive element, a second resistive element, and an adder circuit. The divider may be configured to divide the set of optical packet signals into the first and second divided sets of optical packet signals. The first light receiving device may be adapted to receive the first divided set of optical packet signals and generate a first photocurrent signal as the first electric signal. The first light receiving device may be coupled to the first normalizing unit so as to supply the first photocurrent signal to the first normalizing unit. The second light receiving device may be adapted to receive the second divided set of optical packet signals and generate a second photocurrent signal as the second electric signal. The second light receiving device may be coupled to the second normalizing unit to supply the second photocurrent signal to the second normalizing unit. The first resistive element may be coupled between an input of the first normalizing unit and a fixed voltage supply. The first resistive element generates a first voltage signal at the input of the first normalizing unit. The second resistive element may be coupled between an input of the second normalizing unit and the fixed voltage supply. The second resistive element generates a second voltage signal at the input of the second normalizing unit. The adder circuit may have first and second inputs connected to outputs of the first and second normalizing units. The adder circuit may have an output coupled to the address determination unit.

Preferably, the address recognition apparatus may further include a divider, a first light receiving device, a second light receiving device, a first resistive element, a second resistive element, a first comparator, a second comparator, and a logic AND circuit. The divider may be configured to divide the set of optical packet signals into the first and second divided sets of optical packet signals. The first light receiving device may be adapted to receive the first divided set of optical packet signals and generate a first photocurrent signal as the first electric signal. The first light receiving device may be coupled to the first normalizing unit so as to supply the first photocurrent signal to the first normalizing unit. The second light receiving device may be adapted to receive the second divided set of optical packet signals and generate a second photocurrent signal as the second electric signal. The second light receiving device may be coupled to the second normalizing unit to supply the second photocurrent signal to the second normalizing unit. The first resistive element may be coupled between an input of the first normalizing unit and a fixed voltage supply. The first resistive element generates a first voltage signal at the input of the first normalizing unit so as to allow the first normalizing unit to normalize the first voltage signal, thereby generating a first normalized voltage signal. The second resistive element may be coupled between an input of the second normalizing unit and the fixed voltage supply. The second resistive element generates a second voltage signal at the input of the second normalizing unit so as to allow the second normalizing unit to normalize the second voltage signal, thereby generating a second normalized voltage signal. The first comparator may be configured to receive the first normalized voltage signal and compare the maximum value of the first normalized voltage signal with a third threshold, thereby generating a first comparison result digital signal. The second comparator may be configured to receive the second normalized voltage signal and compare the maximum value of the second normalized voltage signal with the third threshold, thereby generating a second comparison result digital signal. The logic AND circuit may be configured to perform a logical AND operation of the first and second comparison result digital signals and generate a logic signal so as to allow the address determination unit to refer to the logic signal.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
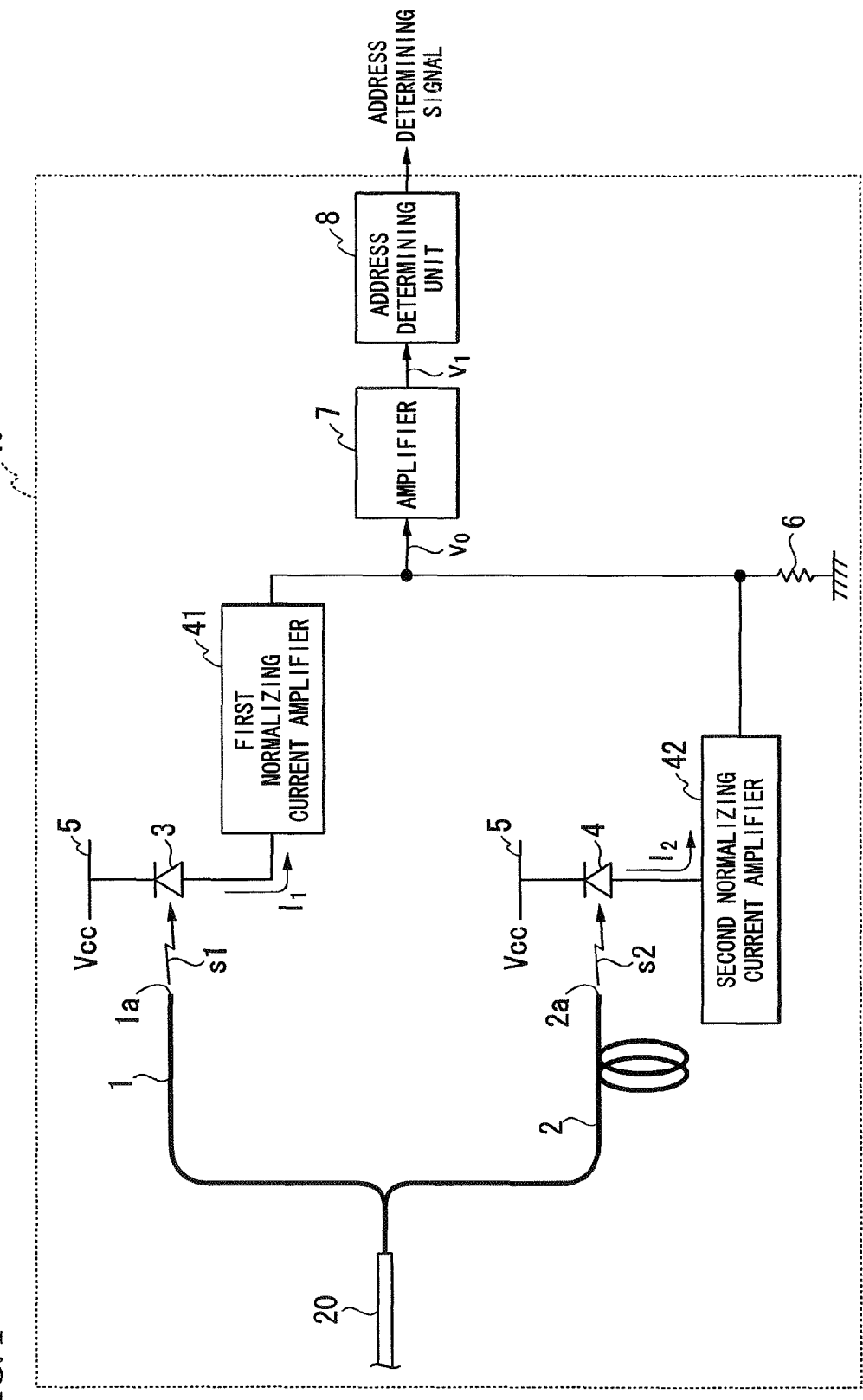
FIG. 1 is a block diagram illustrating a configuration of an address recognition apparatus in accordance with a first embodiment of the present invention.

A first embodiment of the present invention will be described. FIG. 1 is a block diagram illustrating a configuration of an address recognition apparatus in accordance with a first embodiment of the present invention.

In some cases, an address recognition apparatus 40 may include, but is not limited to, a first optical path 1, a second optical path 2, a first light receiving device 3, a second light receiving device 4, a DC power supply 5, a resistive element 6, an amplifier 7, an address determining unit 8, a first normalizing current amplifier 41, and a second normalizing current amplifier 42.

Figure 5:
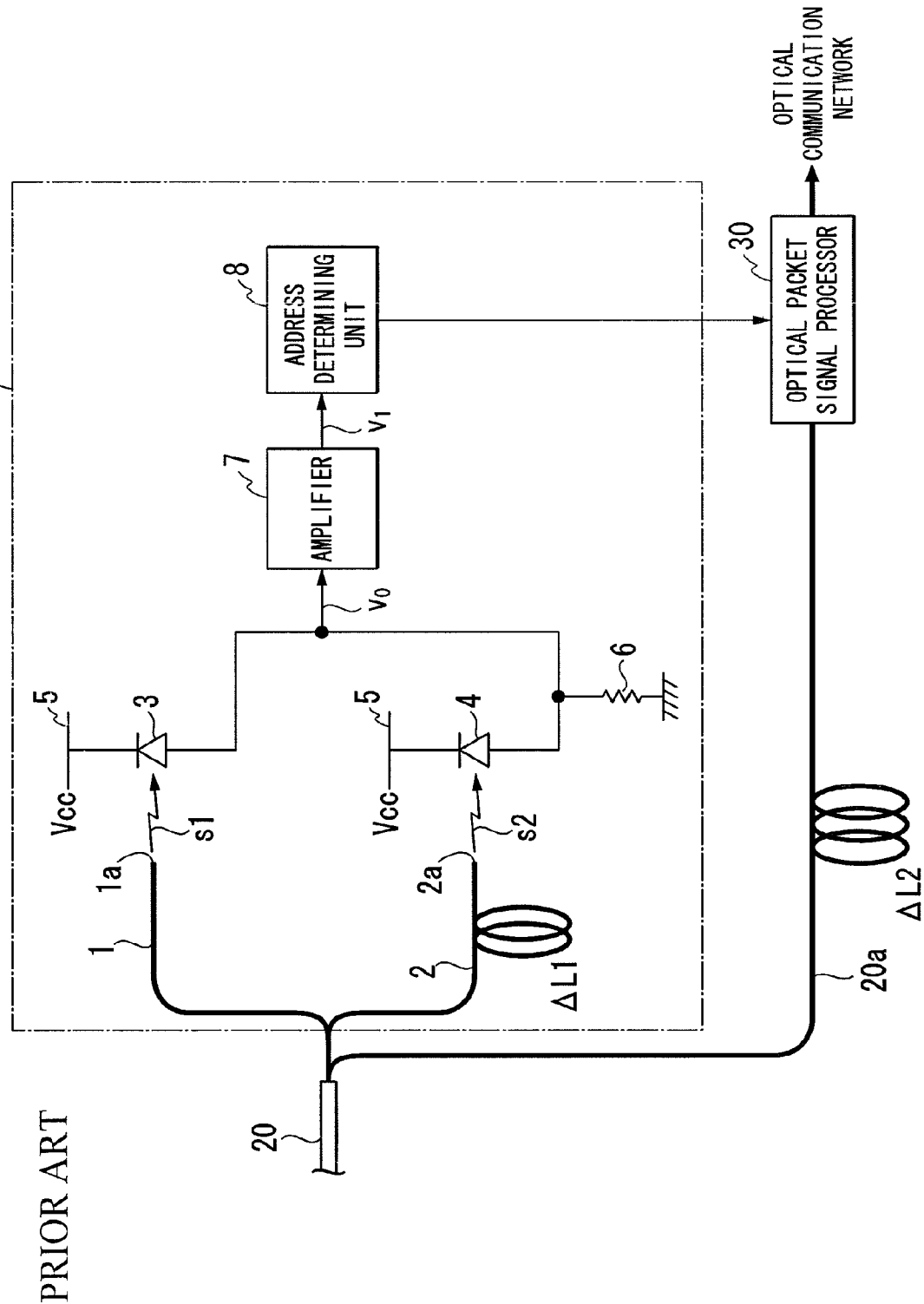
FIG. 5 is a diagram illustrating a configuration of a conventional address recognition apparatus to be used in the optical packet communication.
Figure 6A:
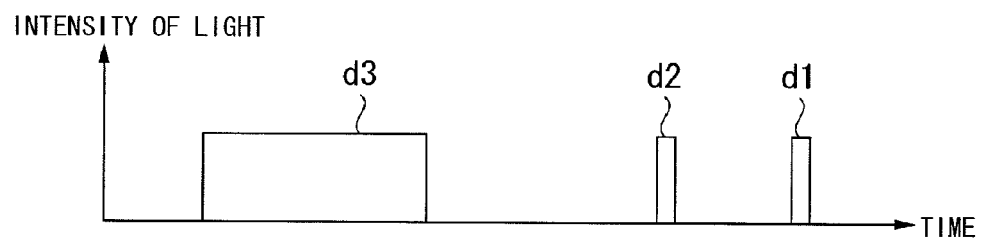
FIG. 6A is a timing chart illustrating a waveform of a first example of the optical packet signal that is input into the address recognition apparatus shown in FIG. 5.
Figure 6B:
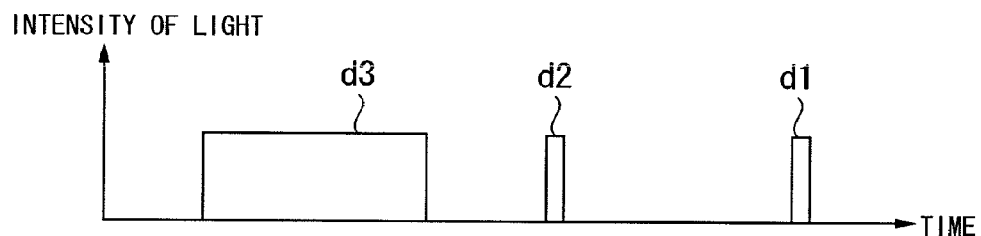
FIG. 6B is a timing chart illustrating a waveform of a second example of the optical packet signal that is input into the address recognition apparatus shown in FIG. 5.
Figure 7:
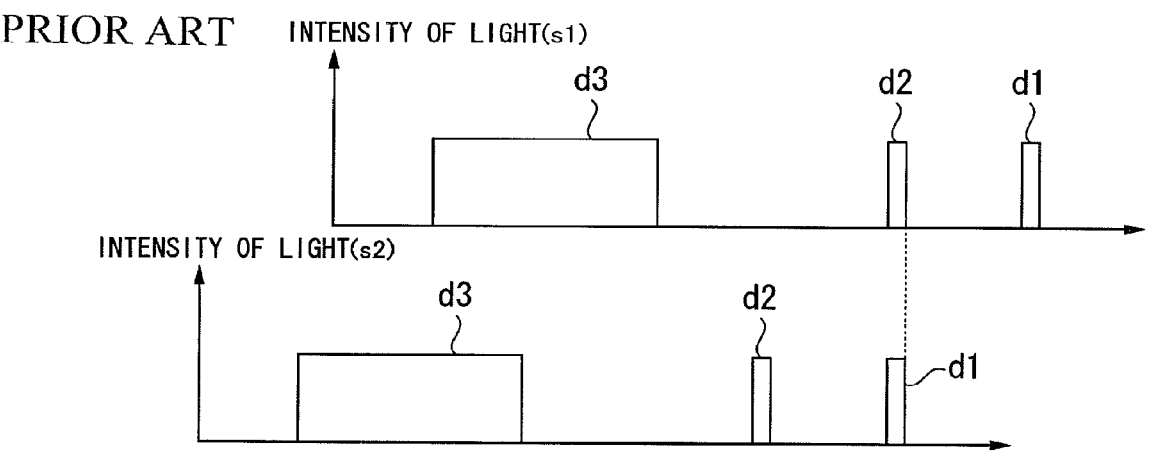
FIG. 7 is a timing chart illustrating a time difference between when the first light receiving device receives the first divided set of optical packet signal and when the second light receiving device receives the second divided set of optical packet signal.
Figure 8:
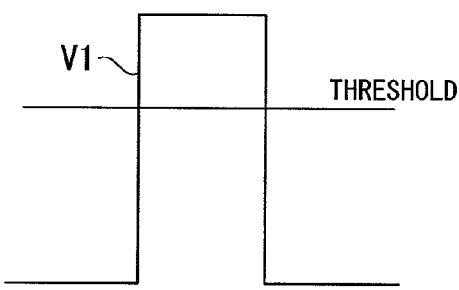
FIG. 8 is a diagram illustrating a relationship of an amplified voltage to a predetermined threshold.

Each of the first and second optical paths 1 and 2 is optically coupled to an optical fiber 20 that is adapted to transmit optical packet signals. The optical fiber 20 is also optically coupled to a delay optical fiber that is not illustrated in FIG. 1, but has been described with reference to FIG. 5. An optical packet signal processor is optically coupled through the delay optical fiber to the optical fiber. The optical packet signal processor is not illustrated in FIG. 1, but has been described with reference to FIG. 5.

A set of optical packet signals is transmitted on the optical fiber 20, and then divided by a divider into a first divided set of optical packet signal s1, a second divided-set of optical packet signal s2, and a third divided-set of optical packet signal. The divider can be realized by a known optical element that is configured to divide or split a set of optical signals into a plurality of sets of optical signals.

In some cases, the first optical path 1 may be formed by, but is not limited to, an optical fiber that has a predetermined optical path length. The first optical path 1 may have a first emitting edge 1*a*. The first optical path 1 may be adapted to transmit the first divided-set of optical packet signals s1 to the first emitting edge 1*a* so that a first divided beam of light representing the first divided-set of optical packet signals s1 is emitted from the first emitting edge 1*a* toward the first light receiving device 3.

The second optical path 2 may also have a second emitting edge 2*a*. The second optical path 2 may be formed by, but is not limited to, an optical fiber that has a predetermined optical path length that is longer by a difference $\Delta L1$ than that of the first optical path 1. The second optical path 2 may have a second emitting edge 2*a*. The second optical path 2 may be adapted to transmit the second divided-set of optical packet signals s2 to the second emitting edge 2*a* so that a second divided beam of light representing the second divided-set of optical packet signals s2 is emitted from the second emitting edge 2*a* toward the second light receiving device 4.

In some cases, the first light receiving device 3 can be realized by, but is not limited to, a light emitting device that can be adapted to receive the first divided beam of light representing the first divided-set of optical packet signals s1 and generate a first photocurrent $I_1$ representing a first intensity of the first divided beam of light. The first light receiving device 3 may have a cathode electrode that is electrically coupled to the DC power supply 5. The first light receiving device 3 may have an anode electrode that is electrically coupled to the resistive element 6. The anode electrode of the first light receiving device 3 can also be electrically coupled to the first normalizing current amplifier 41.

In some cases, the second light receiving device 4 can be realized by a light emitting device that can be adapted to receive the second divided beam of light representing the second divided-set of optical packet signals s2 and generate a second photocurrent $I_2$ representing a second intensity of the second divided beam of light. The second light receiving device 4 may have a cathode electrode that is electrically coupled to the DC power supply 5. The second light receiving device 4 may have an anode electrode that is electrically coupled to the resistive element 6. The anode electrode of the second light receiving device 4 can also be electrically coupled to the second normalizing current amplifier 42.

The first and second photocurrents $I_1$ and $I_2$ flow together through the resistive element 6, whereby a voltage signal V0 appears across the resistive element 6.

The DC power supply 5 may be adapted to supply a DC voltage Vcc to the cathode electrodes of the first and second light receiving devices 3 and 4.

The first normalizing current amplifier 41 may be configured to perform as a first current normalizing device. The first normalizing current amplifier 41 may be electrically coupled to the first light receiving device 3 to receive a first photocurrent $I_1$ from the first light receiving device 3. The first photocurrent $I_1$ is a current flowing through the first light receiving device 3. The first normalizing current amplifier 41 may be adapted to perform an auto power control function that normalizes the first photocurrent $I_1$ so as to set the maximum value of the first photocurrent $I_1$ at a predetermined value $I_0$. In other words, the first normalizing current amplifier 41 may be adapted to generate a first normalized current that has a maximum value $I_0$ from the first photocurrent $I_1$.

If the maximum value of the first photocurrent $I_1$ is smaller than the predetermined value $I_0$, then the first normalizing current amplifier 41 amplifies the first photocurrent $I_1$ so that the maximum value of the first photocurrent $I_1$ becomes equal to the predetermined value $I_0$. If the maximum value of the first photocurrent $I_1$ is greater than the predetermined value $I_0$, then the first normalizing current amplifier 41 restricts or reduces the first photocurrent $I_1$ so that the maximum value of the first photocurrent $I_1$ becomes equal to the predetermined value $I_0$.

For example, the first normalizing current amplifier 41 may have an input that is electrically coupled to the anode electrode of the first light receiving device 3. The first normalizing current amplifier 41 may have an output that is eclectically coupled to the resistive element 6. The output of the first normalizing current amplifier 41 is electrically coupled to an input of the amplifier 7.

The second normalizing current amplifier 42 may be configured to perform as a second current normalizing device. The second normalizing current amplifier 42 may be electrically coupled to the second light receiving device 4 to receive a second photocurrent $I_2$ from the second light receiving device 4. The second photocurrent $I_2$ is a current flowing through the second light receiving device 4. The second normalizing current amplifier 42 may be adapted to perform an auto power control function that normalizes the second photocurrent $I_2$ so as to set the maximum value of the second photocurrent $I_2$ at the predetermined value $I_0$. In other words, the second normalizing current amplifier 42 may be adapted to generate a second normalized current that has the maximum value $I_0$ from the second photocurrent $I_2$.

If the maximum value of the second photocurrent $I_2$ is smaller than the predetermined value $I_0$, then the second normalizing current amplifier 42 amplifies the second photocurrent $I_2$ so that the maximum value of the second photocurrent $I_2$ becomes equal to the predetermined value $I_0$. If the maximum value of the second photocurrent $I_2$ is greater than the predetermined value $I_0$, then the second normalizing current amplifier 42 restricts or reduces the second photocurrent $I_2$ so that the maximum value of the second photocurrent $I_2$ becomes equal to the predetermined value $I_0$.

For example, the second normalizing current amplifier 42 may have an input that is electrically coupled to the anode electrode of the second light receiving device 4. The second normalizing current amplifier 42 may have an output that is eclectically coupled to the resistive element 6. The output of the second normalizing current amplifier 42 is electrically coupled to the input of the amplifier 7.

In some cases, the resistive element 6 can be realized by a circuitry having a resistive impedance. The resistive element 6 may have a first side that is electrically coupled to the outputs of the first and second normalizing current amplifiers 41 and 42. The resistive element 6 may also have a second side that is electrically coupled to a fixed voltage supply that provides a predetermined fixed voltage that is lower than the voltage supplied by the DC power supply 5.

In some cases, the amplifier 7 may be adapted to receive a voltage signal V0 that appears across the resistive element 6 and generate an amplified voltage signal V1.

In some cases, the address determining unit 8 may be functionally coupled to the amplifier 7 to receive the amplified voltage signal V1 from the amplifier 7. The address determining unit 8 may be configured to perform a predetermined set of signal processing, based on the amplified voltage signal V1, so as to determine whether or not the received set of optical packet signals that has been transmitted on the optical fiber 20 has a destination address to the self station associated with the address recognition apparatus 40. The address determining unit 8 may be configured to generate an address determination signal that represents the result of determination on the address. The address determining unit 8 may be configured to supply the address determination signal to the optical packet signal processor that is placed on the follower stage to the address recognition apparatus 40.

In some cases, the delay optical fiber can be realized by an optical fiber that has a delay optical path length difference from the first optical path length of the first optical path 1. The delay optical fiber can be adapted to transmit the third divided-set of optical packet signal from the optical fiber 20 to the optical packet signal processor.

In some cases, the optical packet signal processor can be optically coupled to the delay optical fiber to receive the third divided-set of optical packet signal that has been transmitted on the delay optical fiber. The optical packet signal processor can be functionally coupled to the address determining unit 8 to receive the address determination signal from the address determining unit 8. The optical packet signal processor is configured to perform a predetermined set of signal processing of the third divided-set of optical packet signal, based on the address determination signal, thereby generating a set of processed optical packet signals. In some cases, the optical packet signal processor can be configured to transmit the set of processed optical packet signals to the optical communication network. In other cases, the optical packet signal processor can be configured to transmit, without performing any processing, the third divided-set of optical packet signal to the optical communication network.

Operations of the address recognition apparatus 40 will be described. The set of optical packet signals is transmitted on the optical fiber 20, and then divided by the divider into the first divided set of optical packet signal s1 to be transmitted on the first optical path 1, a second divided-set of optical packet signal s2 to be transmitted on the second optical path 2, and a third divided-set of optical packet signal to be transmitted on the delayed optical fiber.

The first divided set of optical packet signal s1 is transmitted on the first optical path 1 and then emits from the first emitting edge 1a toward the first light receiving device 3. The second divided set of optical packet signal s2 is transmitted on the second optical path 2 and then emits from the second emitting edge 2a toward the second light receiving device 4. The second optical path 2 is longer by the optical path length difference ΔL1 than the first optical path 1. The optical path length difference ΔL1 causes a difference in time between when the first light receiving device 3 receives the first divided set of optical packet signal s1 and when the second light receiving device 4 receives the second divided set of optical packet signal s2.

The optical path length difference ΔL1 is previously adjusted so that the address bit d2 of the first divided set of optical packet signal received by the first light receiving device 3 is phase-matched to the header bit d2 of the second divided set of optical packet signal received by the second light receiving device 4. In other words, only when the set of optical packet signal transmitted on the optical fiber 20 has a specific or predetermined destination address, then the first and second light receiving devices 3 and 4 receive concurrently the address bit d2 of the first divided set of optical packet signal s1 and the header bit d1 of the second divided set of optical packet signal, respectively.

The first divided beam of light representing the first divided-set of optical packet signals s1 is received by the first light receiving device 3. A first photocurrent $I_1$ representing a first intensity of the first divided beam of light is then generated by the first light receiving device 3.

The second divided beam of light representing the second divided-set of optical packet signals s2 is received by the second light receiving device 4. A second photocurrent $I_2$ representing a second intensity of the second divided beam of light is then generated by the second light receiving device 4.

The first photocurrent $I_1$ is input into the first normalizing current amplifier 41. The first photocurrent $I_1$ is normalized by the first normalizing current amplifier 41 so that the maximum value of the first photocurrent $I_1$ is adjusted to or becomes equal to the predetermined value $I_0$. The second photocurrent $I_2$ is input into the second normalizing current amplifier 42. The second photocurrent $I_2$ is normalized by the second normalizing current amplifier 42 so that the maximum value of the first photocurrent $I_2$ is adjusted to or becomes equal to the predetermined value $I_0$.

A voltage signal V0 is caused across the resistive element 6. The voltage signal V0 is then input into the amplifier 7 and amplified into an amplified voltage signal V1 by the amplifier 7. The amplified voltage signal V1 is input into the address determining unit 8.

The address determining unit 8 compares the maximum value of the amplified signal V1 with a given threshold. If the address determining unit 8 verifies that the maximum value is equal to or higher than the threshold, then the address determining unit 8 determines that the set of optical packet signals transmitted on the optical fiber 20 has the same destination address as the address to the self station associated with the address recognition apparatus 40, thereby generating a first state of address determination signal. The first state of address determination signal can be high. The first state of address determination signal is input into the optical packet signal processor.

If the address determining unit 8 verifies that the maximum value is lower than the threshold, then the address determining unit 8 determines that the set of optical packet signals transmitted on the optical fiber 20 has a different destination address from the address to the self station associated with the address recognition apparatus 40, thereby generating a second state of address determination signal. The second state of address determination signal can be low. The second state of address determination signal is input into the optical packet signal processor.

The third divided set of optical packet signal is transmitted on the delay optical fiber. The delay optical path length difference of the delay optical fiber causes a time delay in allowing the optical packet signal processor to receive the third divided set of optical packet signal. The delay optical path length difference is set taking into account a time until the address determination process is completed by the address determining unit 8.

Upon receipt of the input of the first state of state of address determination signal, the optical packet signal processor determines that the address of the set of optical packet signals transmitted on the optical fiber 20 has the same destination address as the address of the self station associated with the address recognition apparatus 40. In this case, the optical packet signal processor applies the predetermined set of signal processing to the third divided set of optical packet signal that has been transmitted on the delay optical fiber, and the optical packet signal processor transmits a set of processed optical packet signal to the optical communication network.

Upon receipt of the input of the second state of state of address determination signal, the optical packet signal processor determines that the address of the set of optical packet signals transmitted on the optical fiber 20 has a different destination address from the address of the self station associated with the address recognition apparatus 40. In this case, the optical packet signal processor transmits the third divided set of optical packet signal to the optical communication network without performing any processing.

Figure 2A:
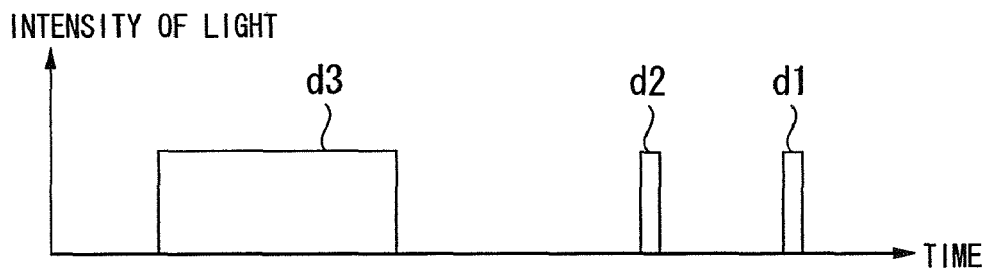
FIG. 2A is a timing chart illustrating a waveform of an example of an optical packet signal that is input into the address recognition apparatus 40 shown in FIG. 1.
Figure 2B:
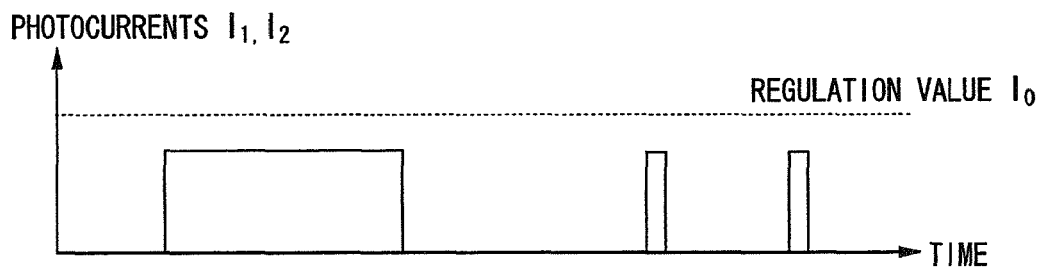
FIG. 2B is a timing chart illustrating a waveform of each of the first and second photocurrents $I_1$ and $I_2$ having a maximum current value that is lower than the predetermined value $I_0$.
Figure 2C:
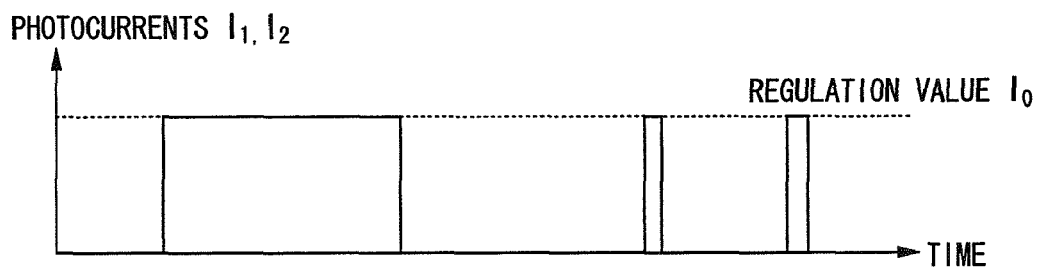
FIG. 2C is a timing chart illustrating a waveform of each normalized current from the first and second photocurrents $I_1$ and $I_2$ by the first and second normalizing current amplifier, respectively, each normalized current having a maximum current value that is equal to than the predetermined value $I_0$.
Figure 2D:
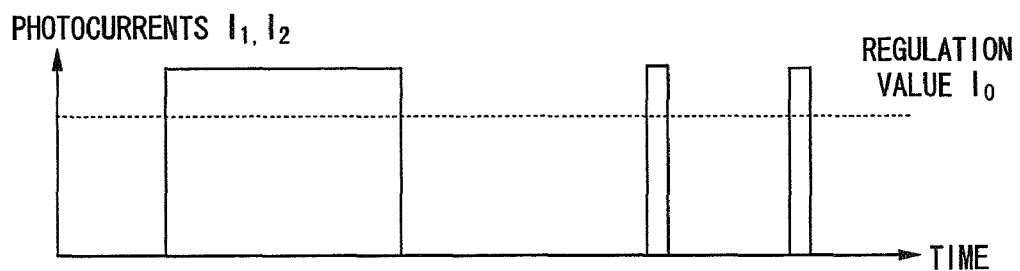
FIG. 2D is a timing chart illustrating a waveform of each of the first and second photocurrents $I_1$ and $I_2$ having a maximum current value that is higher than the predetermined value $I_0$.

FIG. 2A is a timing chart illustrating a waveform of an example of an optical packet signal that is input into the address recognition apparatus 40 shown in FIG. 1. FIG. 2B is a timing chart illustrating a waveform of each of the first and second photocurrents $I_1$ and $I_2$ having a maximum current value that is lower than the predetermined value $I_0$. FIG. 2C is a timing chart illustrating a waveform of each normalized current from the first and second photocurrents $I_1$ and $I_2$ by the first and second normalizing current amplifier, respectively, each normalized current having a maximum current value that is equal to the predetermined value $I_0$. FIG. 2D is a timing chart illustrating a waveform of each of the first and second photocurrents $I_1$ and $I_2$ having a maximum current value that is higher than the predetermined value $I_0$.

As shown in FIG. 2A, the optical packet signal includes a header bit d1 so called to as a frame delimiter, an address bit d2 defining a destination address, and a payload d3 including various types of data. In the case of optical packet communication, the timing of appearing the address bit d2 represents the address. Namely, the coordinate on the time-axis of the address bit d2 defines the address.

If, as shown in FIG. 2B, the maximum value of the first and second photocurrents $I_1$ and $I_2$ is smaller than the predetermined value $I_0$, then as shown in FIG. 2C the first normalizing current amplifier 41 amplifies the first photocurrent $I_1$ so that the maximum value of the first photocurrent $I_1$ becomes equal to the predetermined value $I_0$, and also the second normalizing current amplifier 42 amplifies the second photocurrent $I_2$ so that the maximum value of the second photocurrent $I_2$ becomes equal to the predetermined value $I_0$.

If, as shown in FIG. 2D, the maximum value of the first and second photocurrents $I_1$ and $I_2$ is higher than the predetermined value $I_0$, then as shown in FIG. 2C the first normalizing current amplifier 41 restricts or reduces the first photocurrent $I_1$ so that the maximum value of the first photocurrent $I_1$ becomes equal to the predetermined value $I_0$, and also the second normalizing current amplifier 42 restricts or reduces the second photocurrent $I_2$ so that the maximum value of the second photocurrent $I_2$ becomes equal to the predetermined value $I_0$.

The intensity of the set of optical packet signals transmitted on the optical fiber 20 is not always constant but may vary largely. In these cases, however, the maximum current value of the first photocurrent $I_1$ is normalized to the predetermined value $I_0$ by the first normalizing current amplifier 41, as well as the maximum current value of the second photocurrent $I_2$ is normalized to the predetermined value $I_0$ by the second normalizing current amplifier 42.

For example, if the first and second light receiving devices 3 and 4 receive concurrently the address bit d2 of the first divided set of optical packet signal s1 and the header bit d1 of the second divided set of optical packet signal, respectively, then this means that the set of optical packet signal transmitted on the optical fiber 20 has the destination address that is identical to the address of the self station associated with the address recognition apparatus 40. In this case, however, it is possible that the intensity of the set of input optical packet signals having been transmitted on the optical fiber 20 is so weak that the maximum current values of the first and second photocurrents $I_1$ and $I_2$ are lower than the predetermined value $I_0$. The first and second normalizing current amplifiers 41 and 42 amplify the first and second photocurrents $I_1$ and $I_2$ so that the maximum current values of the first and second photocurrents $I_1$ and $I_2$ become equal to the predetermined value $I_0$. A voltage signal V0 appears across the resistive element 6, wherein the voltage signal V0 is proportional to a current value that is higher by two times than the predetermined value $I_0$. The address recognition apparatus 40 determines correctly that the set of optical packet signal transmitted on the optical fiber 20 has the same destination address as the address of the self station associated with the address recognition apparatus 40, even if the set of input optical packet signals having been transmitted on the optical fiber 20 has a large variation in the intensity.

If the first and second light receiving devices 3 and 4 receive, at different timings, the address bit d2 of the first divided set of optical packet signal s1 and the header bit d1 of the second divided set of optical packet signal, respectively, then this means that the set of optical packet signal transmitted on the optical fiber 20 has a different destination address from the address of the self station associated with the address recognition apparatus 40. In this case, however, it is possible that the intensity of the set of input optical packet signals having been transmitted on the optical fiber 20 is so strong that the maximum current values of the first and second photocurrents $I_1$ and $I_2$ are higher than the predetermined value $I_0$. The first and second normalizing current amplifiers 41 and 42 restrict or reduce the first and second photocurrents $I_1$ and $I_2$ so that the maximum current values of the first and second photocurrents $I_1$ and $I_2$ become equal to the predetermined value $I_0$. The voltage signal V0 appears across the resistive element 6, wherein the voltage signal V0 is proportional to a current value that is equal to the predetermined value $I_0$. The address recognition apparatus 40 determines correctly that the set of optical packet signal transmitted on the optical fiber 20 has a different destination address from the address of the self station associated with the address recognition apparatus 40.

Even if the intensity of the set of input optical packet signals having been transmitted on the optical fiber 20 shows a large variation, then the first and second normalizing current amplifiers 41 and 42 normalize the first and second photocurrents $I_1$ and $I_2$ so that the maximum values of the first and second photocurrents $I_1$ and $I_2$ are adjusted to or become equal to the predetermined value $I_0$. As a result, the voltage signal V0 appearing across the resistive element 6 is independent from the variation in the intensity of the set of input optical packet signals. Thus, the amplified voltage signal V1 produced from the voltage signal V0 is also independent from the variation in the intensity of the set of input optical packet signals.

The address determining unit 8 compares the maximum value of the amplified signal V1 with the threshold. If the address determining unit 8 verifies that the maximum value is equal to or higher than the threshold, then the address determining unit 8 determines that the set of optical packet signals transmitted on the optical fiber 20 has the same destination address as the address to the self station associated with the address recognition apparatus 40, without receiving the influence of the variation in the intensity of the set of input optical packet signals. If the address determining unit 8 verifies that the maximum value is lower than the threshold, then the address determining unit 8 determines that the set of optical packet signals transmitted on the optical fiber 20 has a different destination address from the address to the self station associated with the address recognition apparatus 40, without receiving the influence of the variation in the intensity of the set of input optical packet signals.

Second Embodiment

Figure 3:
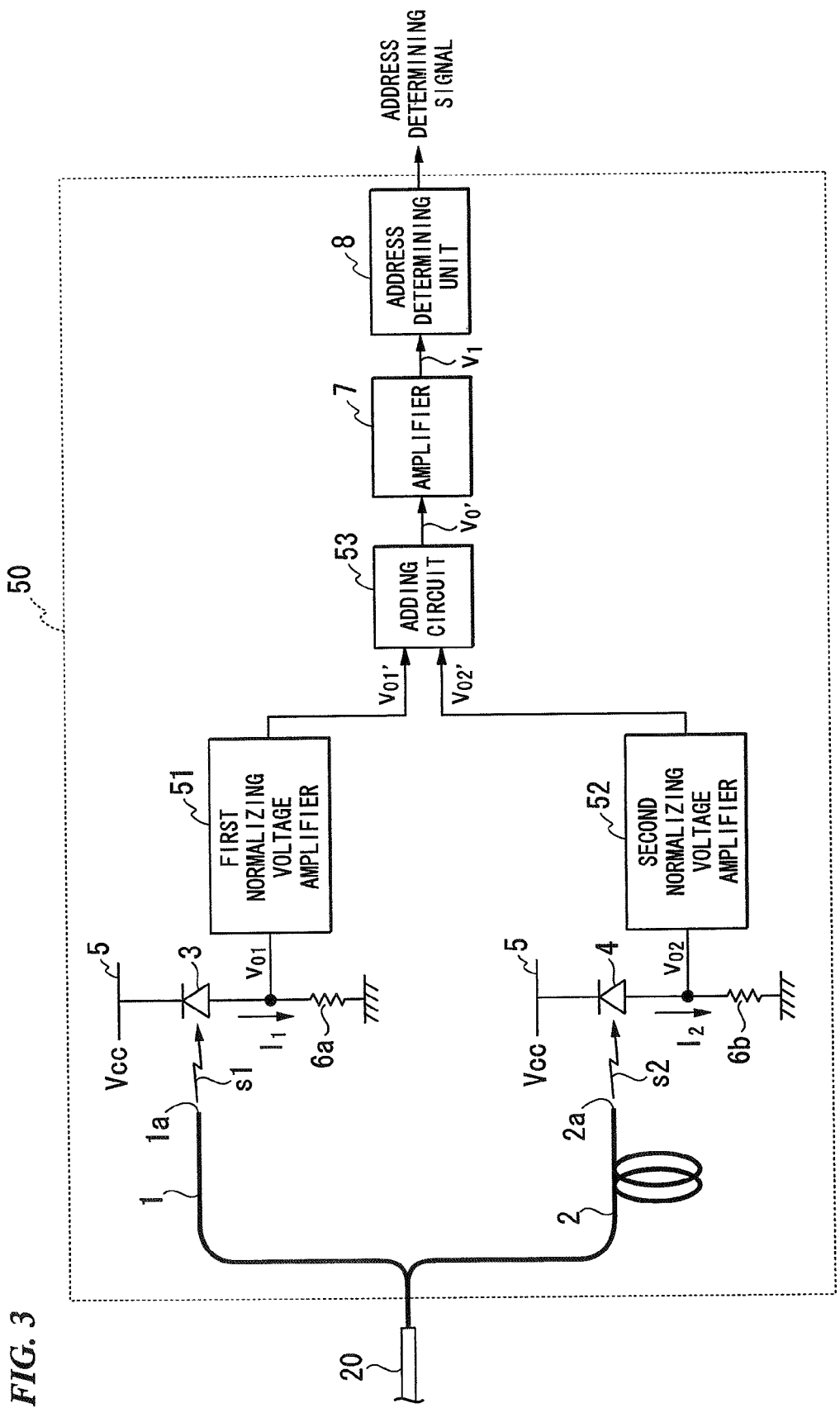
FIG. 3 is a block diagram illustrating another configuration of an address recognition apparatus in accordance with a second embodiment of the present invention.

A second embodiment of the present invention will be described. FIG. 3 is a block diagram illustrating another configuration of an address recognition apparatus in accordance with a second embodiment of the present invention.

In some cases, an address recognition apparatus 50 may include, but is not limited to, the first optical path 1, the second optical path 2, the first light receiving device 3, the second light receiving device 4, the DC power supply 5, a first resistive element 6a, a second resistive element 6b, the amplifier 7, the address determining unit 8, a first normalizing voltage amplifier 51, a second normalizing voltage amplifier 52, and an adder circuit 53. As compared to the address recognition apparatus 40, the address recognition apparatus 50 substitutes the first and second resistive elements 6a and 6b for the resistive element 6, and the first and second normalizing voltage amplifiers 51 and 52 for the first and second normalizing current amplifiers 41 and 42. The address recognition apparatus 50 has an additional element of the adding unit 53.

The optical fiber 20, the first and second optical paths 1 and 2, the first and second light receiving devices 3 and 4, and the DC power supply 5 are the same as those described in the first embodiment. Duplicate descriptions of those elements will be omitted.

In some cases, the first light receiving device 3 can be realized by, but is not limited to, a light emitting device that can be adapted to receive the first divided beam of light representing the first divided-set of optical packet signals s1 and generate a first photocurrent $I_1$ representing a first intensity of the first divided beam of light. The first light receiving device 3 may have a cathode electrode that is electrically coupled to the DC power supply 5. The first light receiving device 3 may have an anode electrode that is electrically coupled to the first resistive element 6a. The anode electrode of the first light receiving device 3 can also be electrically coupled to the first normalizing voltage amplifier 51. The first photocurrent $I_1$ flows through the first resistive element 6a, whereby a first voltage signal V01 appears across the first resistive element 6a.

In some cases, the second light receiving device 4 can be realized by a light emitting device that can be adapted to receive the second divided beam of light representing the second divided-set of optical packet signals s2 and generate a second photocurrent $I_2$ representing a second intensity of the second divided beam of light. The second light receiving device 4 may have a cathode electrode that is electrically coupled to the DC power supply 5. The second light receiving device 4 may have an anode electrode that is electrically coupled to the second resistive element 6b. The anode electrode of the second light receiving device 4 can also be electrically coupled to the second normalizing voltage amplifier 52. The second photocurrent $I_2$ flows through the second resistive element 6b, whereby a second voltage signal V02 appears across the second resistive element 6b.

The DC power supply 5 may be adapted to supply a DC voltage Vcc to the cathode electrodes of the first and second light receiving devices 3 and 4.

In some cases, the first resistive element 6a can be realized by a circuitry having a resistive impedance. The first resistive element 6a may have a first side that is electrically coupled to an input of the first and normalizing voltage amplifier 51. The first side of the first resistive element 6a is also electrically coupled to the anode of the first light receiving element 3. The first resistive element 6a may also have a second side that is electrically coupled to a fixed voltage supply that provides a predetermined fixed voltage that is lower than the voltage supplied by the DC power supply 5.

In some cases, the second resistive element 6b can be realized by a circuitry having a resistive impedance. The second resistive element 6b may have a second side that is electrically coupled to an input of the second and normalizing voltage amplifier 52. The first side of the second resistive element 6b is also electrically coupled to the anode of the second light receiving element 4. The second resistive element 6b may also have a second side that is electrically coupled to the fixed voltage supply that provides the predetermined fixed voltage that is lower than the voltage supplied by the DC power supply 5.

The first normalizing voltage amplifier 51 may be configured to perform as a first voltage normalizing device. The first normalizing voltage amplifier 51 may be electrically coupled to the first light receiving device 3 to receive the first voltage signal V01 from the first light receiving device 3. The first voltage signal V01 is a voltage applied across the first resistive element 6a. The first normalizing voltage amplifier 51 may be adapted to perform an auto power control function that normalizes the first voltage signal V01 so as to set the maximum value of the first voltage signal V01 at a predetermined value V03. In other words, the first normalizing voltage amplifier 51 may be adapted to generate a first normalized voltage signal V01' that has a maximum value V03 from the first voltage signal V01. The first normalized voltage signal V01' is output from the first normalizing voltage amplifier 51. The output of the first normalizing voltage amplifier 51 is electrically coupled to the adding unit 53. The first normalizing voltage amplifier 51 is configured to supply the first normalized voltage signal V01' to the adding unit 53.

If the maximum value of the first voltage signal V01 is smaller than the predetermined value V03, then the first normalizing voltage amplifier 51 amplifies the first voltage signal V01 so that the maximum value of the first normalized voltage signal V01' is equal to the predetermined value V03. If the maximum value of the first voltage signal V01 is greater than the predetermined value V03, then the first normalizing voltage amplifier 51 restricts or reduces the first voltage signal V01 so that the maximum value of the first normalized voltage signal V01' is equal to the predetermined value V03.

For example, the first normalizing voltage amplifier 51 may have an input that is electrically coupled to the anode electrode of the first light receiving device 3. The input of the first normalizing voltage amplifier 51 may also be electrically coupled to the first resistive element 6a. The first normalizing voltage amplifier 51 may have an output that is electrically coupled to the input of the adding unit 53.

The second normalizing voltage amplifier 52 may be configured to perform as a second voltage normalizing device. The second normalizing voltage amplifier 52 may be electrically coupled to the second light receiving device 4 to receive the second voltage signal V02 from the second light receiving device 4. The second voltage signal V02 is a voltage applied across the second resistive element 6b. The second normalizing voltage amplifier 52 may be adapted to perform an auto power control function that normalizes the second voltage signal V02 so as to set the maximum value of the second voltage signal V02 at the predetermined value V03. In other words, the second normalizing voltage amplifier 52 may be adapted to generate a second normalized voltage signal V02' that has the maximum value V03 from the second voltage signal V02. The second normalized voltage signal V02' is output from the second normalizing voltage amplifier 52. The output of the second normalizing voltage amplifier 52 is electrically coupled to the adding unit 53. The second normalizing voltage amplifier 52 is configured to supply the second normalized voltage signal V02' to the adding unit 53.

If the maximum value of the second voltage signal V02 is smaller than the predetermined value V03, then the second normalizing voltage amplifier 52 amplifies the second voltage signal V02 so that the maximum value of the second normalized voltage, signal V02' is equal to the predetermined value V03. If the maximum value of the second voltage signal V02 is greater than the predetermined value V03, then the second normalizing voltage amplifier 52 restricts or reduces the second voltage signal V02 so that the maximum value of the second normalized voltage signal V02' is equal to the predetermined value V03.

For example, the second normalizing voltage amplifier 52 may have an input that is electrically coupled to the anode electrode of the second light receiving device 4. The input of the second normalizing voltage amplifier 52 may also be electrically coupled to the second resistive element 6b. The second normalizing voltage amplifier 52 may have an output that is electrically coupled to the input of the adding unit 53.

The adder circuit 53 may be electrically coupled to the first normalizing voltage amplifier 51 to receive the first normalized voltage signal V01' from the first normalizing voltage amplifier 51. The adder circuit 53 may also be electrically coupled to the second normalizing voltage amplifier 52 to receive the second normalized voltage signal V02' from the second normalizing voltage amplifier 52.

In some cases, the adder circuit 53 may be configured to perform as an adder. The adder circuit 53 may be electrically coupled to the first normalizing voltage amplifier 51 to receive the first normalized voltage signal V01' from the first normalizing voltage amplifier 51. The adder circuit 53 may be electrically coupled to the second normalizing voltage amplifier 52 to receive the second normalized voltage signal V02' from the second normalizing voltage amplifier 52. The adder circuit 53 may be configured to add the first and second normalized voltage signals V01' and V02', thereby generating an added voltage signal V0'. As described above, the first and second normalized voltage signals V01' and V02' are normalized by the first and second normalizing voltage amplifiers 51 and 52 so that the maximum value of each of the first and second normalized voltage signals V01' and V02' is equal to the predetermined value V03. In other words, the maximum value of each of the first and second normalized voltage signals V01' and V02' is fixed at the predetermined value V03 and is independent from substantive variation in the intensity of the set of optical packet signals transmitted on the optical fiber 20. Thus, the maximum value of the added voltage signal V0' is either equal to or higher by two times than the predetermined value V03, and is independent from substantive variation in the intensity of the set of optical packet signals transmitted on the optical fiber 20.

In some cases, the adder circuit 7 may have first and second inputs. The first input is electrically coupled to the output of the first normalizing voltage amplifier 51 to receive the first normalized voltage signal V01'. The second input is electrically coupled to the output of the second normalizing voltage amplifier 52 to receive the second normalized voltage signal V02'. The adder circuit 7 may also have an output from which the added voltage signal V0' is outputted.

In some cases, the amplifier 7 may be electrically coupled to the adder circuit 53 to receive the added voltage signal V0' from the adder circuit 53. The amplifier 7 may be configured to amplify the added voltage signal V0' thereby generating an amplified voltage signal V1. Since the maximum value of the added voltage signal V0' is independent from substantive variation in the intensity of the set of optical packet signals transmitted on the optical fiber 20, then the maximum value of the amplified voltage signal V1 is also independent from substantive variation in the intensity of the set of optical packet signals transmitted on the optical fiber 20.

In some cases, the address determining unit 8 may be functionally coupled to the amplifier 7 to receive the amplified voltage signal V1 from the amplifier 7. The address determining unit 8 may be configured to perform a predetermined set of signal processing, based on the amplified voltage signal V1, so as to determine whether or not the received set of optical packet signals that has been transmitted on the optical fiber 20 has a destination address to the self station associated with the address recognition apparatus 50. The address determining unit 8 may be configured to generate an address determination signal that represents the result of determination on the address. The address determining unit 8 may be configured to supply the address determination signal to the optical packet signal processor that is placed on the follower stage to the address recognition apparatus 50.

As described above, even if the set of input optical packet signals having been transmitted on the optical fiber 20 has a large variation in the intensity, then the first and second photocurrents $I_1$ and $I_2$ also have large variations in intensity, thereby causing the first and second voltage signals V01 and V02 to also have variations in intensity. The first and second normalizing voltage amplifiers 51 and 52 operate to normalize the first and second voltage signals V01 and V02 respectively so that the maximum values of the first and second voltage signals V01 and V02 are equal to the predetermined value V03. The first normalizing voltage amplifier 51 generates the first normalized voltage signal V01' that have the maximum value V03. The second normalizing voltage amplifier 52 generates the second normalized voltage signal V02' that have the maximum value V03. The adder circuit 53 generates, from the first and second normalized voltage signals V01' and V02', the added voltage signal V0' that is independent from substantive variation in the intensity of the set of optical packet signals transmitted on the optical fiber 20. The amplifier 7 generates, from the added voltage signal V0', the amplified voltage signal V1 that is independent from substantive variation in the intensity of the set of optical packet signals transmitted on the optical fiber 20. The first and second normalizing voltage amplifiers 51 and 52 allow the address determining unit 8 to perform the above-described determination on the address independently from substantive variation in the intensity of the set of optical packet signals transmitted on the optical fiber 20. In other words, the address determination signal indicating the determination result is independent from substantive variation in the intensity of the set of optical packet signals transmitted on the optical fiber 20.

In some cases, the delay optical fiber may be realized by an optical fiber that has a delay optical path length difference from the first optical path length of the first optical path 1. The delay optical fiber can be adapted to transmit the third divided-set of optical packet signal from the optical fiber 20 to the optical packet signal processor.

In some cases, the optical packet signal processor can be optically coupled to the delay optical fiber to receive the third divided-set of optical packet signal that has been transmitted on the delay optical fiber. The optical packet signal processor can be functionally coupled to the address determining unit 8 to receive the address determination signal from the address determining unit 8. The optical packet signal processor is configured to perform a predetermined set of signal processing of the third divided-set of optical packet signal, based on the address determination signal, thereby generating a set of processed optical packet signals. In some cases, the optical packet signal processor can be configured to transmit the set of processed optical packet signals to the optical communication network. In other cases, the optical packet signal processor can be configured to transmit, without performing any processing, the third divided-set of optical packet signal to the optical communication network.

Operations of the address recognition apparatus 50 will be described. The set of optical packet signals is transmitted on the optical fiber 20, and then divided by the divider into the first divided set of optical packet signal s1 to be transmitted on the first optical path 1, a second divided-set of optical packet signal s2 to be transmitted on the second optical path 2, and a third divided-set of optical packet signal to be transmitted on the delayed optical fiber.

The first divided beam of light representing the first divided-set of optical packet signals s1 is received by the first light receiving device 3. A first photocurrent $I_1$ representing a first intensity of the first divided beam of light is then generated by the first light receiving device 3. The first photocurrent $I_1$ flows through the first resistive element 6a, thereby generating a first voltage signal V01 that is proportional to the first photocurrent $I_1$.

The second divided beam of light representing the second divided-set of optical packet signals s2 is received by the second light receiving device 4. A second photocurrent $I_2$ representing a second intensity of the second divided beam of light is then generated by the second light receiving device 4. The second photocurrent $I_2$ flows through the second resistive element 6b, thereby generating a second voltage signal V02 that is proportional to the second photocurrent $I_2$.

The first voltage signal V01 is input into the first normalizing voltage amplifier 51. The first voltage signal V01 is normalized by the first normalizing voltage amplifier 51 so that the maximum value of the first voltage signal V01 is equal to the predetermined value V03, whereby the first normalized voltage signal V01' is generated which has the maximum value V03. The first normalized voltage signal V01' is independent from substantive variation in the intensity of the set of optical packet signals transmitted on the optical fiber 20.

The second voltage signal V02 is input into the second normalizing voltage amplifier 52. The second voltage signal V02 is normalized by the second normalizing voltage amplifier 52 so that the maximum value of the second voltage signal V02 is equal to the predetermined value V03, whereby the second normalized voltage signal V02' is generated which has the maximum value V03. The second normalized voltage signal V02' is independent from substantive variation in the intensity of the set of optical packet signals transmitted on the optical fiber 20.

The first and second voltage signals V01 are input into the adder circuit 53. The first and second voltage signals V01 are added by the adder circuit 53 to generate the added voltage signal V0'.

The added voltage signal V0' is input into the amplifier 7. The added voltage signal V0' is amplified by the amplifier 7 to generate the amplified voltage signal V1. The amplified voltage signal V1 is independent from substantive variation in the intensity of the set of optical packet signals transmitted on the optical fiber 20.

The amplified voltage signal V1 is input into the address determining unit 8. The address determining unit 8 compares the maximum value of the amplified signal V1 with a given threshold. If the address determining unit 8 verifies that the maximum value is equal to or higher than the threshold, then the address determining unit 8 determines that the set of optical packet signals transmitted on the optical fiber 20 has the same destination address as the address to the self station associated with the address recognition apparatus 50, thereby generating a first state of address determination signal. The first state of address determination signal can be high. The first state of address determination signal is input into the optical packet signal processor.

If the address determining unit 8 verifies that the maximum value is lower than the threshold, then the address determining unit 8 determines that the set of optical packet signals transmitted on the optical fiber 20 has a different destination address from the address to the self station associated with the address recognition apparatus 50, thereby generating a second state of address determination signal. The second state of address determination signal can be low. The second state of address determination signal is input into the optical packet signal processor.

The first and second normalizing voltage amplifiers 51 and 52 allow the address determining unit 8 to perform the above-described determination on the address independently from substantive variation in the intensity of the set of optical packet signals transmitted on the optical fiber 20. In other words, the address determination signal indicating the determination result is independent from substantive variation in the intensity of the set of optical packet signals transmitted on the optical fiber 20.

The third divided set of optical packet signal is transmitted on the delay optical fiber. The delay optical path length difference of the delay optical fiber causes a time delay in allowing the optical packet signal processor to receive the third divided set of optical packet signal. The delay optical path length difference is set taking into account a time until the address determination process is completed by the address determining unit 8.

Upon receipt of the input of the first state of state of address determination signal, the optical packet signal processor determines that the address of the set of optical packet signals transmitted on the optical fiber 20 has the same destination address as the address of the self station associated with the address recognition apparatus 50. In this case, the optical packet signal processor applies the predetermined set of signal processing to the third divided set of optical packet signal that has been transmitted on the delay optical fiber, and the optical packet signal processor transmits a set of processed optical packet signal to the optical communication network.

Upon receipt of the input of the second state of state of address determination signal, the optical packet signal processor determines that the address of the set of optical packet signals transmitted on the optical fiber 20 has a different destination address from the address of the self station associated with the address recognition apparatus 50. In this case, the optical packet signal processor transmits the third divided set of optical packet signal to the optical communication network without performing any processing.

If the maximum value of the first and second voltage signals V01 and V02 is smaller than the predetermined value V03, then the first normalizing voltage amplifier 51 amplifies the first voltage signal V01 so that the maximum value of the first voltage signal V01 becomes equal to the predetermined value V03, and also the second normalizing voltage amplifier 52 amplifies the second voltage signal V02 so that the maximum value of the second voltage signal V02 becomes equal to the predetermined value V03.

If the maximum value of the first and second voltage signals V01 and V02 is greater than the predetermined value V03, then the first normalizing voltage amplifier 51 reduces the first voltage signal V01 so that the maximum value of the first voltage signal V01 becomes equal to the predetermined value V03, and also the second normalizing voltage amplifier 52 reduces the second voltage signal V02 so that the maximum value of the second voltage signal V02 becomes equal to the predetermined value V03.

The intensity of the set of optical packet signals transmitted on the optical fiber 20 is not always constant but may vary largely. In these cases, however, the maximum value of the first voltage signal V01 is normalized to the predetermined value V03 by the first normalizing voltage amplifier 51, as well as the maximum value of the second voltage signal V02 is normalized to the predetermined value V03 by the second normalizing voltage amplifier 52.

For example, if the first and second light receiving devices 3 and 4 receive concurrently the address bit d2 of the first divided set of optical packet signal s1 and the header bit d1 of the second divided set of optical packet signal, respectively, then this means that the set of optical packet signal transmitted on the optical fiber 20 has the destination address that is identical to the address of the self station associated with the address recognition apparatus 50. In this case, however, it is possible that the intensity of the set of input optical packet signals having been transmitted on the optical fiber 20 is so weak that the maximum values of the first and second voltage signals V01 and V02 are lower than the predetermined value V03. The first and second normalizing voltage amplifiers 51 and 52 amplify the first and second voltage signals V01 and V02 so that the maximum values of the first and second voltage signals V01 and V02 become equal to the predetermined value V03.

The first and second normalized voltage signals V01' and V02' are independent from substantive variation in the intensity of the set of optical packet signals transmitted on the optical fiber 20. Thus, the added voltage signal V01' is independent from substantive variation in the intensity of the set of optical packet signals transmitted on the optical fiber 20. The amplified voltage signal V1 is also independent from substantive variation in the intensity of the set of optical packet signals transmitted on the optical fiber 20. The first and second normalizing voltage amplifiers 51 and 52 allow the address determining unit 8 to perform the above-described determination on the address independently from substantive variation in the intensity of the set of optical packet signals transmitted on the optical fiber 20. Accordingly, the address recognition apparatus 50 determines correctly that the set of optical packet signal transmitted on the optical fiber 20 has the same destination address as the address of the self station associated with the address recognition apparatus 50.

If the first and second light receiving devices 3 and 4 receive, at different timings, the address bit d2 of the first divided set of optical packet signal s1 and the header bit d1 of the second divided set of optical packet signal, respectively, then this means that the set of optical packet signal transmitted on the optical fiber 20 has a different destination address from the address of the self station associated with the address recognition apparatus 50. In this case, however, it is possible that the intensity of the set of input optical packet signals having been transmitted on the optical fiber 20 is so strong that the maximum values of the first and second voltage signals V01 and V02 are higher than the predetermined value V03. The first and second normalizing voltage amplifiers 51 and 52 reduces the first and second voltage signals V01 and V02 so that the maximum values of the first and second voltage signals V01 and V02 become equal to the predetermined value V03.

The first and second normalized voltage signals V01' and V02' are independent from substantive variation in the intensity of the set of optical packet signals transmitted on the optical fiber 20. Thus, the added voltage signal V01' is independent from substantive variation in the intensity of the set of optical packet signals transmitted on the optical fiber 20. The amplified voltage signal V1 is also independent from substantive variation in the intensity of the set of optical packet signals transmitted on the optical fiber 20. The first and second normalizing voltage amplifiers 51 and 52 allow the address determining unit 8 to perform the above-described determination on the address independently from substantive variation in the intensity of the set of optical packet signals transmitted on the optical fiber 20. Accordingly, the address recognition apparatus 50 determines correctly that the set of optical packet signal transmitted on the optical fiber 20 has a different destination address from the address of the self station associated with the address recognition apparatus 50.

Third Embodiment

Figure 4:
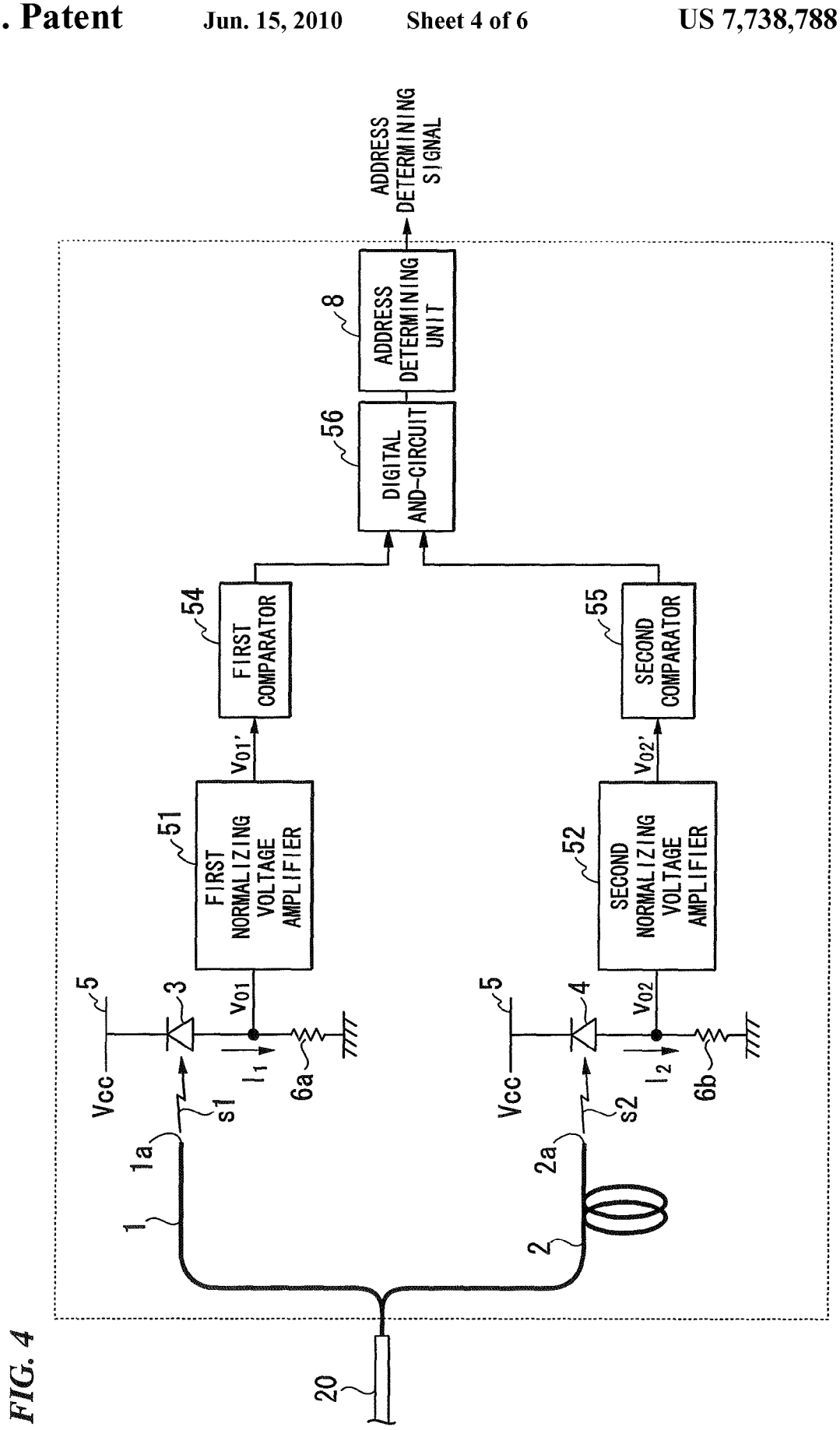
FIG. 4 is a block diagram illustrating still another configuration of an address recognition apparatus in accordance with a third embodiment of the present invention.

A third embodiment of the present invention will be described. FIG. 4 is a block diagram illustrating still another configuration of an address recognition apparatus in accordance with a third embodiment of the present invention. The above-described address recognition apparatuses that are shown in FIGS. 1 and 3 can be realized by an analog circuit configuration. The analog circuit configuration is suitable to exhibit high speed performances that may often need to realize the optical packet communication. The analog circuit configuration is suitable to reduce the time for address recognition operation as shortly as passable.

It is, however, possible that the address recognition apparatus can be realized by digital circuits that can satisfy the requirements for realizing the high speed performance.

In some cases, an address recognition apparatus 60 may include, but is not limited to, the first optical path 1, the second optical path 2, the first light receiving device 3, the second light receiving device 4, the DC power supply 5, the first resistive element 6a, the second resistive element 6b, the address determining unit 8, the first normalizing voltage amplifier 51, the second normalizing voltage amplifier 52, a first comparator 54, a second comparator 55, and a digital AND circuit 56. As compared to the address recognition apparatus 50, the address recognition apparatus 60 substitutes the digital AND circuit 56 for the adder circuit 53 and the amplifier 7. The address recognition apparatus 60 further includes additional elements of the first and second comparators 54 and 55.

The optical fiber 20, the first and second optical paths 1 and 2, the first and second light receiving devices 3 and 4, and the DC power supply 5 are the same as those described in the first embodiment. The first and second resistive elements 6a and 6b and the first and second normalizing voltage amplifiers 51 and 52 are the same as described in the second embodiment. Duplicate descriptions of those elements will be omitted.

The first normalizing voltage amplifier 51 may be electrically coupled to the first light receiving device 3 to receive the first voltage signal V01 from the first light receiving device 3. The first voltage signal V01 is a voltage applied across the first resistive element 6a. The first normalizing voltage amplifier 51 may be adapted to perform an auto power control function that normalizes the first voltage signal V01 so as to set the maximum value of the first voltage signal V01 at a predetermined value V03. In other words, the first normalizing voltage amplifier 51 may be adapted to generate a first normalized voltage signal V01' that has a maximum value V03 from the first voltage signal V01. The first normalized voltage signal V01' is output from the first normalizing voltage amplifier 51. The output of the first normalizing voltage amplifier 51 is electrically coupled to the first comparator 54. The first normalizing voltage amplifier 51 is configured to supply the first normalized voltage signal V01' to the first comparator 54.

If the maximum value of the first voltage signal V01 is smaller than the predetermined value V03, then the first normalizing voltage amplifier 51 amplifies the first voltage signal V01 so that the maximum value of the first normalized voltage signal V01' is equal to the predetermined value V03. If the maximum value of the first voltage signal V01 is greater than the predetermined value V03, then the first normalizing voltage amplifier 51 restricts or reduces the first voltage signal V01 so that the maximum value of the first normalized voltage signal V01' is equal to the predetermined value V03.

For example, the first normalizing voltage amplifier 51 may have an input that is electrically coupled to the anode electrode of the first light receiving device 3. The input of the first normalizing voltage amplifier 51 may also be electrically coupled to the first resistive element 6a. The first normalizing voltage amplifier 51 may have an output that is electrically coupled to the input of the first comparator 54.

The second normalizing voltage amplifier 52 may be electrically coupled to the second light receiving device 4 to receive the second voltage signal V02 from the second light receiving device 4. The second voltage signal V02 is a voltage applied across the second resistive element 6b. The second normalizing voltage amplifier 52 may be adapted to perform an auto power control function that normalizes the second voltage signal V02 so as to set the maximum value of the second voltage signal V02 at the predetermined value V03. In other words, the second normalizing voltage amplifier 52 may be adapted to generate a second normalized voltage signal V02' that has the maximum value V03 from the second voltage signal V02. The second normalized voltage signal V02' is output from the second normalizing voltage amplifier 52. The output of the second normalizing voltage amplifier 52 may be electrically coupled to the second comparator 55. The second normalizing voltage amplifier 52 may be configured to supply the second normalized voltage signal V02' to the second comparator 55.

If the maximum value of the second voltage signal V02 is smaller than the predetermined value V03, then the second normalizing voltage amplifier 52 amplifies the second voltage signal V02 so that the maximum value of the second normalized voltage signal V02' is equal to the predetermined value V03. If the maximum value of the second voltage signal V02 is greater than the predetermined value V03, then the second normalizing voltage amplifier 52 restricts or reduces the second voltage signal V02 so that the maximum value of the second normalized voltage signal V02' is equal to the predetermined value V03.

For example, the second normalizing voltage amplifier 52 may have an input that is electrically coupled to the anode electrode of the second light receiving device 4. The input of the second normalizing voltage amplifier 52 may also be electrically coupled to the second resistive element 6b. The second normalizing voltage amplifier 52 may have an output that is electrically coupled to the input of the second comparator 55.

The first comparator 54 may be electrically coupled to the first normalizing voltage amplifier 51 to receive the first normalized voltage signal V01'. The first comparator 54 may be configured to compare the maximum value of the first normalized voltage signal V01' with a first threshold. The first comparator 54 may be configured to generate a first comparison signal that indicates whether the maximum value of the first normalized voltage signal V01' is equal to or higher or lower than the first threshold. If the first comparator 54 verifies that the maximum value of the first normalized voltage signal V01' is equal to or higher than the first threshold, then the first comparator 54 generates a first state of the first comparison signal. The first state of the first comparison signal indicates that the maximum value of the first normalized voltage signal V01' is higher than the first threshold. If the first comparator 54 verifies that the maximum value of the first normalized voltage signal V01' is lower than the first threshold, then the first comparator 54 generates a second state of the first comparison signal. The second state of the first comparison signal indicates that the maximum value of the first normalized voltage signal V01' is lower than the first threshold. In a case, the first and second states of the first comparison signal may be high and low, respectively.

The second comparator 55 may be electrically coupled to the second normalizing voltage amplifier 52 to receive the second normalized voltage signal V02'. The second comparator 55 may be configured to compare the maximum value of the second normalized voltage signal V02' with a second threshold. The second comparator 55 may be configured to generate a second comparison signal that indicates whether the maximum value of the second normalized voltage signal V02' is higher or lower than the second threshold. If the second comparator 55 verifies that the maximum value of the second normalized voltage signal V02' is equal to or higher than the second threshold, then the second comparator 55 generates a first state of the second comparison signal. The first state of the second comparison signal indicates that the maximum value of the second normalized voltage signal V02' is equal to or higher than the second threshold. If the second comparator 55 verifies that the maximum value of the second normalized voltage signal V02' is lower than the second threshold, then the second comparator 55 generates a second state of the second comparison signal. The second state of the second comparison signal indicates that the maximum value of the second normalized voltage signal V02' is lower than the second threshold. In a case, the first and second states of the second comparison signal may be high and low, respectively.

The digital AND circuit 56 may be electrically coupled to the first comparator 54 to receive the first comparison signal from the first comparator 54. The digital AND circuit 56 may also be electrically coupled to the second comparator 55 to receive the second comparison signal from the second comparator 55. The digital AND circuit 56 may be configured to perform a logical AND operation of the first and second compassion signals, and generates a logic output. If the first and second comparison signals are in the first state or high level, then the digital AND circuit 56 generates a first state of the logic output. The first state of the logic output may be high. If one of the first and second comparison signals is in the first state and another is in the second state, then the digital AND circuit 56 generates a second state of the logic output. The second state of the logic output may be low.

If the first and second light receiving devices 3 and 4 receive concurrently the address bit d2 of the first divided set of optical packet signal s1 and the header bit d1 of the second divided set of optical packet signal, respectively, then this means that the set of optical packet signal transmitted on the optical fiber 20 has the destination address that is identical to the address of the self station associated with the address recognition apparatus 60. In this case, the first and second comparators 54 and 55 generate the first state of the first and second comparison signals. Thus, the digital AND circuit 56 generates the first state of the logic output.

If the first and second light receiving devices 3 and 4 receive, at different timings, the address bit d2 of the first divided set of optical packet signal s1 and the header bit d1 of the second divided set of optical packet signal, respectively, then this means that the set of optical packet signal transmitted on the optical fiber 20 has a different destination address from the address of the self station associated with the address recognition apparatus 60. In this case, the first and second comparators 54 and 55 generate the first state of the first comparison signal and the second state of the second comparison signal. Thus, the digital AND circuit 56 generates the second state of the logic output.

In some cases, the address determining unit 8 may be functionally coupled to the digital AND circuit 56 to receive the logic output from the digital AND circuit 56. The address determining unit 8 may be configured to perform a predetermined set of signal processing, based on the logic output, so as to determine whether or not the received set of optical packet signals that has been transmitted on the optical fiber 20 has a destination address to the self station associated with the address recognition apparatus 60. Upon receipt of the first state of the logic output, the address determining unit 8 determines that the set of optical packet signal transmitted on the optical fiber 20 has the destination address that is identical to the address of the self station associated with the address recognition apparatus 60. Upon receipt of the second state of the logic output, the address determining unit 8 determines that the set of optical packet signal transmitted on the optical fiber 20 has a different destination address from the address of the self station associated with the address recognition apparatus 60. The address determining unit 8 may be configured to generate an address determination signal that represents the result of determination on the address. The address determining unit 8 may be configured to supply the address determination signal to the optical packet signal processor that is placed on the follower stage to the address recognition apparatus 60.

As described above, even if the set of input optical packet signals having been transmitted on the optical fiber 20 has a large variation in intensity, then the first and second photocurrents $I_1$ and $I_2$ also have large variations in intensity, thereby causing the first and second voltage signals V01 and V02 to also have variations in intensity. The first and second normalizing voltage amplifiers 51 and 52 operate to normalize the first and second voltage signals V01 and V02 respectively so that the maximum values of the first and second voltage signals V01 and V02 are equal to the predetermined value V03. The first normalizing voltage amplifier 51 generates the first normalized voltage signal V01' that have the maximum value V03. The second normalizing voltage amplifier 52 generates the second normalized voltage signal V02' that have the maximum value V03.

The first comparator 54 compares the first normalized voltage signal V01' with the first threshold and generates the first comparison signal. The second comparator 55 compares the second normalized voltage signal V02' with the second threshold and generates the second comparison signal. The first and second comparison signals are independent from substantive variation in the intensity of the set of optical packet signals transmitted on the optical fiber 20. The digital AND circuit 56 performs the logical AND operation on the first and second comparison signals and generates the logic output. The logic output is thus independent from substantive variation in the intensity of the set of optical packet signals transmitted on the optical fiber 20. The address determining unit 8 performs the determination on the address based on the logic output that is independent from substantive variation in the intensity of the set of optical packet signals transmitted on the optical fiber 20.

The first and second normalizing voltage amplifiers 51 and 52 allow the address determining unit 8 to perform the above-described determination on the address independently from substantive variation in the intensity of the set of optical packet signals transmitted on the optical fiber 20. In other words, the address determination signal indicating the determination result is independent from substantive variation in the intensity of the set of optical packet signals transmitted on the optical fiber 20.

Operations of the address recognition apparatus 60 will be described.

If the maximum value of the first and second voltage signals V01 and V02 is smaller than the predetermined value V03, then the first normalizing voltage amplifier 51 amplifies the first voltage signal V01 so that the maximum value of the first voltage signal V01 becomes equal to the predetermined value V03, and also the second normalizing voltage amplifier 52 amplifies the second voltage signal V02 so that the maximum value of the second voltage signal V02 becomes equal to the predetermined value V03.

If the maximum value of the first and second voltage signals V01 and V02 is greater than the predetermined value V03, then the first normalizing voltage amplifier 51 reduces the first voltage signal V01 so that the maximum value of the first voltage signal V01 becomes equal to the predetermined value V03, and also the second normalizing voltage amplifier 52 reduces the second voltage signal V02 so that the maximum value of the second voltage signal V02 becomes equal to the predetermined value V03.

The intensity of the set of optical packet signals transmitted on the optical fiber 20 is not always constant but may vary largely. In these cases, however, the maximum value of the first voltage signal V01 is normalized to the predetermined value V03 by the first normalizing voltage amplifier 51, as well as the maximum value of the second voltage signal V02 is normalized to the predetermined value V03 by the second normalizing voltage amplifier 52.

For example, if the first and second light receiving devices 3 and 4 receive concurrently the address bit d2 of the first divided set of optical packet signal s1 and the header bit d1 of the second divided set of optical packet signal, respectively, then this means that the set of optical packet signal transmitted on the optical fiber 20 has the destination address that is identical to the address of the self station associated with the address recognition apparatus 60. In this case, however, it is possible that the intensity of the set of input optical packet signals having been transmitted on the optical fiber 20 is so weak that the maximum values of the first and second voltage signals V01 and V02 are lower than the predetermined value V03. The first and second normalizing voltage amplifiers 51 and 52 amplify the first and second voltage signals V01 and V02 so that the maximum values of the first and second voltage signals V01 and V02 become equal to the predetermined value V03.

The first and second normalized voltage signals V01' and V02' are independent from substantive variation in the intensity of the set of optical packet signals transmitted on the optical fiber 20. Thus, the first and second comparison signals are also independent from substantive variation in the intensity of the set of optical packet signals transmitted on the optical fiber 20. The logic output is also independent from substantive variation in the intensity of the set of optical packet signals transmitted on the optical fiber 20. The first and second normalizing voltage amplifiers 51 and 52 allow the address determining unit 8 to perform the above-described determination on the address independently from substantive variation in the intensity of the set of optical packet signals transmitted on the optical fiber 20. Accordingly, the address recognition apparatus 60 determines correctly that the set of optical packet signal transmitted on the optical fiber 20 has the same destination address as the address of the self station associated with the address recognition apparatus 60.

If the first and second light receiving devices 3 and 4 receive, at different timings, the address bit d2 of the first divided set of optical packet signal s1 and the header bit d1 of the second divided set of optical packet signal, respectively, then this means that the set of optical packet signal transmitted on the optical fiber 20 has a different destination address from the address of the self station associated with the address recognition apparatus 60. In this case, however, it is possible that the intensity of the set of input optical packet signals having been transmitted on the optical fiber 20 is so strong that the maximum values of the first and second voltage signals V01 and V02 are higher than the predetermined value V03. The first and second normalizing voltage amplifiers 51 and 52 reduces the first and second voltage signals V01 and V02 so that the maximum values of the first and second voltage signals V01 and V02 become equal to the predetermined value V03.

The first and second normalized voltage signals V01' and V02' are independent from substantive variation in the intensity of the set of optical packet signals transmitted on the optical fiber 20. Thus, the first and second comparison signals are also independent from substantive variation in the intensity of the set of optical packet signals transmitted on the optical fiber 20. The logic output is also independent from substantive variation in the intensity of the set of optical packet signals transmitted on the optical fiber 20. The first and second normalizing voltage amplifiers 51 and 52 allow the address determining unit 8 to perform the above-described determination on the address independently from substantive variation in the intensity of the set of optical packet signals transmitted on the optical fiber 20. Accordingly, the address recognition apparatus 60 determines correctly that the set of optical packet signal transmitted on the optical fiber 20 has a different destination address from the address of the self station associated with the address recognition apparatus 60.

The term "configured" is used to describe a component, section or part of a device includes hardware and/or software that is constructed and/or programmed to carry out the desired function.

The terms of degree such as "substantially," "about," and "approximately" as used herein mean a reasonable amount of deviation of the modified term such that the end result is not significantly changed. For example, these terms can be construed as including a deviation of at least ±5 percents of the modified term if this deviation would not negate the meaning of the word it modifies.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An address recognition apparatus for recognizing a destination address of a set of optical packet signals by setting a delay time of an address bit from a header bit based on the destination address, the address bit and the header bit being included in the set of optical packet signals, the address recognition apparatus comprising:

an optical divider configured to divide the set of optical packet signals into first and second divided sets of optical packet signals, the optical divider being configured to emit the first and second divided sets of optical packet signals with an allocated time difference from each a first light receiving device adapted to receive the first divided set of optical packet signals and output a first light receiving signal;

a second light receiving device adapted to receive the second divided set of optical packet signals and output a second light receiving signal;

a first normalizing unit configured to normalize the first light receiving signal so that the maximum value of the first light receiving signal is equal to a first predetermined value, thereby generating a first normalized signal;

a second normalizing unit configured to normalize the second light receiving signal so that the maximum value of the second light receiving signal is equal to a second predetermined value, thereby generating a second normalized signal; and an address determination unit configured to determine the destination address of the set of optical packet signals, based on the first and second normalized signals, wherein the address determination unit is configured to compare the maximum value of an added signal with a threshold, the added signal having been prepared by adding the first and second normalized signals, the address determination unit is configured to determine that the designation address is identical to an address allocated to a self-station associated with the address recognition apparatus if the maximum value of the added signal is equal to or higher than the threshold, and the address determination unit is configured to determine that the designation address is different from the address allocated to the self-station if the maximum value of the added signal is lower than the threshold.

2. An address recognition apparatus for recognizing a destination address of a set of optical packet signals by setting a delay time of an address bit from a header bit based on the destination address, the address bit and the header bit being included in the set of optical packet signals, the address recognition apparatus comprising:

an optical divider configured to divide the set of optical packet signals into first and second divided sets of optical packet signals, the optical divider being configured to emit the first and second divided sets of optical packet signals with an allocated time difference from each other;

a first light receiving device adapted to receive the first divided set of optical packet signals and output a first light receiving signal;

a second light receiving device adapted to receive the second divided set of optical packet signals and output a second light receiving signal;

a first normalizing unit configured to normalize the first light receiving signal so that the maximum value of the first light receiving signal is equal to a first predetermined value, thereby generating a first normalized signal;

a second normalizing unit configured to normalize the second light receiving signal so that the maximum value of the second light receiving signal is equal to a second predetermined value, thereby generating a second normalized signal; and an address determination unit configured to determine the destination address of the set of optical packet signals, based on the first and second normalized signals, wherein
the first light receiving device comprises a first photodiode that outputs a first current signal, and
the second light receiving device comprises a second photodiode that outputs a second current signal, wherein the address recognition apparatus further comprises:
a DC power supply that supplies a DC voltage to cathodes of the first and second photodiodes; and
a resistive element having first and second sides, the first side being connected to outputs of the first and second normalizing units and an input of the address determination unit, the second side being grounded, and wherein the first photodiode has an anode connected to an input of the first normalizing unit,
the second photodiode has an anode connected to an input of the second normalizing unit,
the first normalizing unit is configured to normalize the first current signal so that the maximum value of the first current signal is equal to a predetermined value,
the second normalizing unit is configured to normalize the second current signal so that the maximum value of the second current signal is equal to the predetermined value, and
the address determination unit is configured to compare the maximum value of a voltage signal across the resistive element with a threshold, the address determination unit is configured to determine that the designation address is identical to an address allocated to a self-station associated with the address recognition apparatus if the maximum value of the voltage signal is equal to or higher than the threshold, and the address determination unit is configured to determine that the designation address is different from the address allocated to the self-station if the maximum value of the voltage signal is lower than the threshold.

3. An address recognition apparatus for recognizing a destination address of a set of optical packet signals by setting a delay time of an address bit from a header bit based on the destination address, the address bit and the header bit being included in the set of optical packet signals, the address recognition apparatus comprising:

an optical divider configured to divide the set of optical packet signals into first and second divided sets of optical packet signals, the optical divider being configured to emit the first and second divided sets of optical packet signals with an allocated time difference from each other;

a first light receiving device adapted to receive the first divided set of optical packet signals and output a first light receiving signal;

a second light receiving device adapted to receive the second divided set of optical packet signals and output a second light receiving signal;

a first normalizing unit configured to normalize the first light receiving signal so that the maximum value of the first light receiving signal is equal to a first predetermined value, thereby generating a first normalized signal;

a second normalizing unit configured to normalize the second light receiving signal so that the maximum value of the second light receiving signal is equal to a second predetermined value, thereby generating a second normalized signal; and an address determination unit configured to determine the destination address of the set of optical packet signals, based on the first and second normalized signals, wherein
the first light receiving device comprises a first photodiode that outputs a first current signal, and
the second light receiving device comprises a second photodiode that outputs a second current signal, wherein the address recognition apparatus further comprises:
a first resistive element having first and second sides, the first side being connected to an anode of the first photodiode and an input of the first normalizing unit, the second side being grounded;
a second resistive element having first and second sides, the first side being connected to an anode of the second photodiode and an input of the second normalizing unit, the second side being grounded; and
a DC power supply that supplies a DC voltage to cathodes of the first and second photodiodes, and wherein the first normalizing unit is configured to normalize a first voltage signal across the first resistive element so that the maximum value of the first voltage signal is equal to a predetermined value, the second normalizing unit is configured to normalize a second voltage signal across the second resistive element so that the maximum value of the second voltage signal is equal to the predetermined value, and the address determination unit is configured to compare the maximum value of an added signal with a threshold, the added signal having been prepared by adding the first and second voltage signals, the address determination unit is configured to determine that the designation address is identical to an address allocated to a self-station associated with the address recognition apparatus if the maximum value of the added signal is equal to or higher than the threshold, and the address determination unit is configured to determine that the designation address is different from the address allocated to the self-station if the maximum value of the added signal is lower than the threshold.

4. An address recognition apparatus for recognizing a destination address of a set of optical packet signals, the address recognition apparatus setting a delay time of an address bit from a header bit based on the destination address, the address bit and the header bit being included in the set of optical packet signals, the address recognition apparatus comprising:

an optical divider configured to divide the set of optical packet signals into first and second divided sets of optical packet signals, the optical divider being configured to emit the first and second divided sets of optical packet signals with an allocated time difference from each other;

a first light receiving device adapted to receive the first divided set of optical packet signals and output a first light receiving signal;

a second light receiving device adapted to receive the second divided set of optical packet signals and output a second light receiving signal;

a first normalizing unit configured to normalize the first light receiving signal so that the maximum value of the first light receiving signal is equal to a first predetermined value, thereby generating a first normalized signal;

a second normalizing unit configured to normalize the second light receiving signal so that the maximum value of the second light receiving signal is equal to a second predetermined value, thereby generating a second normalized signal;

a first comparator configured to compare the first normalized signal with a first threshold, thereby generating a first comparison digital signal;

a second comparator configured to compare the second normalized signal with a second threshold, thereby generating a second comparison digital signal;

a logical AND circuit configured to perform a logical AND operation of the first and second comparison digital signals, thereby generating a logic output; and an address determination unit configured to determine whether the destination address of the set of packet signals is identical to or different from an address allocated to a self-station associated with the address recognition apparatus.

5. An address recognition apparatus comprising:
a first normalizing unit configured to normalize a first electric signal and generate a first normalized signal, the first electric signal being associated with a first divided set of optical packet signals;

a second normalizing unit configured to normalize a second electric signal and generate a second normalized signal, the second electric signal being associated with a second divided set of optical packet signals; and an address determination unit adapted to refer to the first and second normalized signals and determine whether a destination address of a set of optical packet signals is identical to or different from an address allocated to a self-station associated with the address recognition apparatus, wherein the set of optical packet signals has been divided into the first and second divided sets of optical packet signals, wherein the address determination unit refers to maximum values of the first and second normalized signals, and the first and second normalizing units normalize maximum values of the first and second electric signals, respectively, wherein the address determination unit compares a maximum value of an added signal with a first threshold, the added signal being prepared by adding the first and second normalized signals.

6. The address recognition apparatus according to claim 5, wherein if the maximum value of the added signal is equal to or higher than the first threshold, then the address determination unit determines that the destination address is identical to the address allocated to the self-station, and if the maximum value of the added signal is lower than the first threshold, then the address determination unit determines that the destination address is different from the address allocated to the self-station.

7. An address recognition apparatus comprising:
a first normalizing unit configured to normalize a first electric signal and generate a first normalized signal, the first electric signal being associated with a first divided set of optical packet signals;
a second normalizing unit configured to normalize a second electric signal and generate a second normalized signal, the second electric signal being associated with a second divided set of optical packet signals; and
an address determination unit adapted to refer to the first and second normalized signals and determine whether a destination address of a set of optical packet signals is identical to or different from an address allocated to a self-station associated with the address recognition apparatus, wherein the set of optical packet signals has been divided into the first and second divided sets of optical packet signals, wherein the address determination unit refers to maximum values of the first and second normalized signals, and the first and second normalizing units normalize maximum values of the first and second electric signals, respectively,
wherein the address determination unit compares each of first and second maximum values of the first and second normalized signals with a second threshold, and
wherein if each of the first and second maximum values is equal to or higher than the second threshold, then the address determination unit determines that the destination address is identical to the address allocated to the self-station, and if one of the first and second maximum values is equal to or higher than the second threshold and another of the first and second maximum values is lower than the second threshold, then the address determination unit determines that the destination address is different from the address allocated to the self-station.

8. An address recognition apparatus comprising:
a first normalizing unit configured to normalize a first electric signal and generate a first normalized signal, the first electric signal being associated with a first divided set of optical packet signals;
a second normalizing unit configured to normalize a second electric signal and generate a second normalized signal, the second electric signal being associated with a second divided set of optical packet signals; and
an address determination unit adapted to refer to the first and second normalized signals and determine whether a destination address of a set of optical packet signals is identical to or different from an address allocated to a self-station associated with the address recognition apparatus, wherein the set of optical packet signals has been divided into the first and second divided sets of optical packet signals, wherein the address determination unit refers to maximum values of the first and second normalized signals, and the first and second normalizing units normalize maximum values of the first and second electric signals, respectively,
a divider that divides the set of optical packet signals into the first and second divided sets of optical packet signals;
a first optical path configured to emit the first divided set of optical packet signals;
a second optical path configured to emit the second divided set of optical packet signals with a predetermined time difference from when the first optical path emits the first divided set of optical packet signals;
a first light receiving device adapted to receive the first divided set of optical packet signals and generate a first photocurrent signal as the first electric signal, the first light receiving device being coupled to the first normalizing unit so as to supply the first photocurrent signal to the first normalizing unit;
a second light receiving device adapted to receive the second divided set of optical packet signals and generate a second photocurrent signal as the second electric signal, the second light receiving device being coupled to the second normalizing unit to supply the second photocurrent signal to the second normalizing unit; and
a resistive element coupled between each output of the first and second normalizing units and a fixed voltage supply, the resistive element generating a voltage signal at the outputs of the first and second normalizing units, the voltage signal being proportional to a sum of the first and second photocurrent signals.

9. An address recognition apparatus comprising:
a first normalizing unit configured to normalize a first electric signal and generate a first normalized signal, the first electric signal being associated with a first divided set of optical packet signals;
a second normalizing unit configured to normalize a second electric signal and generate a second normalized signal, the second electric signal being associated with a second divided set of optical packet signals; and
an address determination unit adapted to refer to the first and second normalized signals and determine whether a destination address of a set of optical packet signals is identical to or different from an address allocated to a self-station associated with the address recognition apparatus, wherein the set of optical packet signals has been divided into the first and second divided sets of optical packet signals, wherein the address determination unit refers to maximum values of the first and second normalized signals, and the first and second normalizing units normalize maximum values of the first and second electric signals, respectively,
a divider that divides the set of optical packet signals into the first and second divided sets of optical packet signals;
a first optical path configured to emit the first divided set of optical packet signals;
a second optical path configured to emit the second divided set of optical packet signals with a predetermined time difference from when the first optical path emits the first divided set of optical packet signals;
a first light receiving device adapted to receive the first divided set of optical packet signals and generate a first photocurrent signal as the first electric signal, the first light receiving device being coupled to the first normalizing unit so as to supply the first photocurrent signal to the first normalizing unit;
a second light receiving device adapted to receive the second divided set of optical packet signals and generate a second photocurrent signal as the second electric signal, the second light receiving device being coupled to the second normalizing unit to supply the second photocurrent signal to the second normalizing unit;
a first resistive element coupled between an input of the first normalizing unit and a fixed voltage supply, the first resistive element generating a first voltage signal at the input of the first normalizing unit;
a second resistive element coupled between an input of the second normalizing unit and the fixed voltage supply, the second resistive element generating a second voltage signal at the input of the second normalizing unit; and an adder circuit having first and second inputs connected to outputs of the first and second normalizing units, the adder circuit having an output coupled to the address determination unit.

10. An address recognition apparatus comprising:

a first normalizing unit configured to normalize a first electric signal and generate a first normalized signal, the first electric signal being associated with a first divided set of optical packet signals;

a second normalizing unit configured to normalize a second electric signal and generate a second normalized signal, the second electric signal being associated with a second divided set of optical packet signals; and an address determination unit adapted to refer to the first and second normalized signals and determine whether a destination address of a set of optical packet signals is identical to or different from an address allocated to a self-station associated with the address recognition apparatus, wherein the set of optical packet signals has been divided into the first and second divided sets of optical packet signals, wherein the address determination unit refers to maximum values of the first and second normalized signals, and the first and second normalizing units normalize maximum values of the first and second electric signals, respectively, a divider that divides the set of optical packet signals into the first and second divided sets of optical packet signals;

a first optical path configured to emit the first divided set of optical packet signals;

a second optical path configured to emit the second divided set of optical packet signals with a predetermined time difference from when the first optical path emits the first divided set of optical packet signals;

a first light receiving device adapted to receive the first divided set of optical packet signals and generate a first photocurrent signal as the first electric signal, the first light receiving device being coupled to the first normalizing unit so as to supply the first photocurrent signal to the first normalizing unit;

a second light receiving device adapted to receive the second divided set of optical packet signals and generate a second photocurrent signal as the second electric signal, the second light receiving device being coupled to the second normalizing unit to supply the second photocurrent signal to the second normalizing unit;

a first resistive element coupled between an input of the first normalizing unit and a fixed voltage supply, the first resistive element generating a first voltage signal at the input of the first normalizing unit so as to allow the first normalizing unit to normalize the first voltage signal, thereby generating a first normalized voltage signal;

a second resistive element coupled between an input of the second normalizing unit and the fixed voltage supply, the second resistive element generating a second voltage signal at the input of the second normalizing unit so as to allow the second normalizing unit to normalize the second voltage signal, thereby generating a second normalized voltage signal;

a first comparator configured to receive the first normalized voltage signal and compare the maximum value of the first normalized voltage signal with a third threshold, thereby generating a first comparison result digital signal;

a second comparator configured to receive the second normalized voltage signal and compare the maximum value of the second normalized voltage signal with the third threshold, thereby generating a second comparison result digital signal; and a logic AND circuit configured to perform a logical AND operation of the first and second comparison result digital signals and generate a logic signal so as to allow the address determination unit to refer to the logic signal.

* * * * *